United States Patent
Kinomura

(10) Patent No.: US 12,263,750 B2
(45) Date of Patent: Apr. 1, 2025

(54) VEHICLE AND CHARGING SYSTEM

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 150 days.

(21) Appl. No.: 17/860,326

(22) Filed: Jul. 8, 2022

(65) Prior Publication Data

US 2023/0091946 A1   Mar. 23, 2023

(30) Foreign Application Priority Data

Sep. 22, 2021   (JP) ................ 2021-154001

(51) Int. Cl.
| | |
|---|---|
| B60L 53/66 | (2019.01) |
| B60L 53/16 | (2019.01) |
| H02J 7/00 | (2006.01) |

(52) U.S. Cl.
CPC .............. B60L 53/66 (2019.02); B60L 53/16 (2019.02); H02J 7/007 (2013.01); *B60L 2250/26* (2013.01)

(58) Field of Classification Search
CPC ...... B60L 53/66; B60L 53/16; B60L 2250/26; B60L 2250/16; B60L 50/60; B60L 53/14; H02J 7/007; Y02T 10/70; Y02T 10/7072
See application file for complete search history.

(56) References Cited

U.S. PATENT DOCUMENTS

| | | | |
|---|---|---|---|
| 11,498,444 B1* | 11/2022 | Wiegman | ............... B64C 39/04 |
| 2014/0232327 A1 | 8/2014 | Hasegawa et al. | |
| 2015/0280466 A1* | 10/2015 | Owen | ..................... B60L 50/51 |
| | | | 320/137 |
| 2020/0094702 A1 | 3/2020 | Ohtomo | |
| 2020/0384872 A1* | 12/2020 | Nakabayashi | ......... G01R 31/36 |
| 2021/0008993 A1* | 1/2021 | Kuboyama | ............ B60L 53/16 |
| 2021/0086653 A1* | 3/2021 | Wang | ................... H02J 7/0013 |
| 2021/0237595 A1* | 8/2021 | Jung | ..................... G08G 1/0969 |
| 2021/0237605 A1 | 8/2021 | Ando | |
| 2022/0097551 A1* | 3/2022 | Dow | ....................... H04W 4/44 |
| 2022/0297551 A1* | 9/2022 | Lee | ......................... B60L 53/18 |
| 2023/0050979 A1* | 2/2023 | Lee | ......................... B60L 53/62 |

FOREIGN PATENT DOCUMENTS

| | | | |
|---|---|---|---|
| CN | 110920428 A | 3/2020 | |
| JP | 2010093957 A * | 4/2010 | ........... B60L 11/182 |
| JP | 2013-085346 A | 5/2013 | |
| JP | 2014-155411 A | 8/2014 | |
| JP | 2017-175727 A | 9/2017 | |
| JP | 2021-125933 A | 8/2021 | |

OTHER PUBLICATIONS

Kono, Motoki, Apr. 22, 2010, English Machine Translation_ JP2010093957A provided by Patent Translate by EPO and Google (Year: 2010).*

* cited by examiner

*Primary Examiner* — Peter D Nolan
*Assistant Examiner* — Ashley L Redhead, Jr.
(74) *Attorney, Agent, or Firm* — Dinsmore & Shohl LLP

(57) ABSTRACT

A vehicle includes an inlet unit to which a charging connector provided in a charging device is connected, a control unit configured to communicate with the charging device, a power accumulation device charged with power delivered through the charging connector, and an input unit to which a user makes an input. The control unit is configured to, upon determining that a charging stop request is input to the input unit during charging, stop the charging.

4 Claims, 19 Drawing Sheets

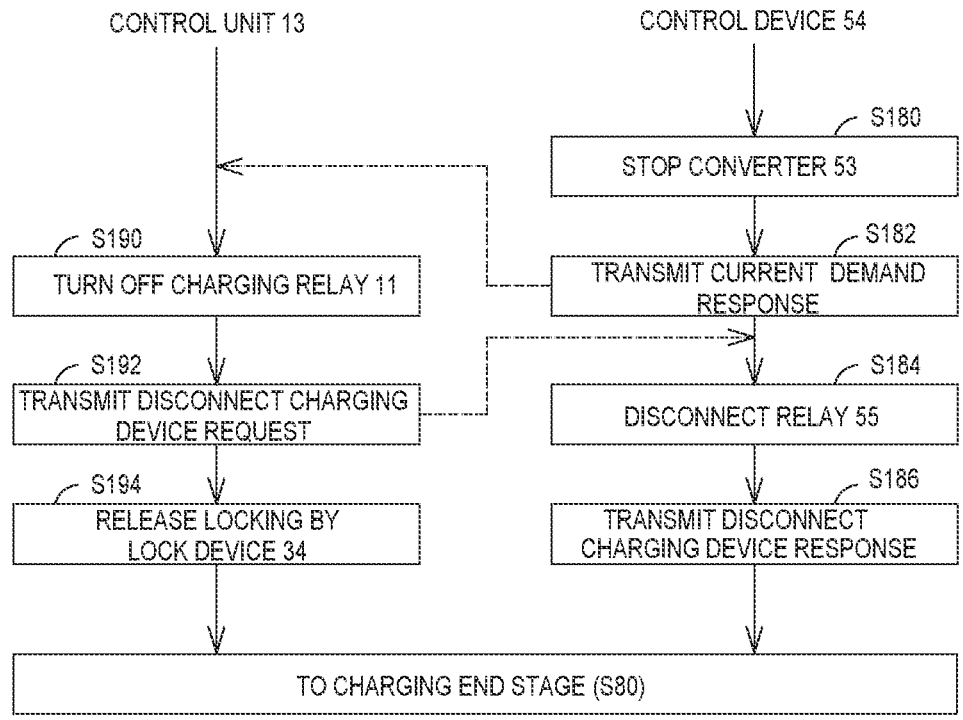
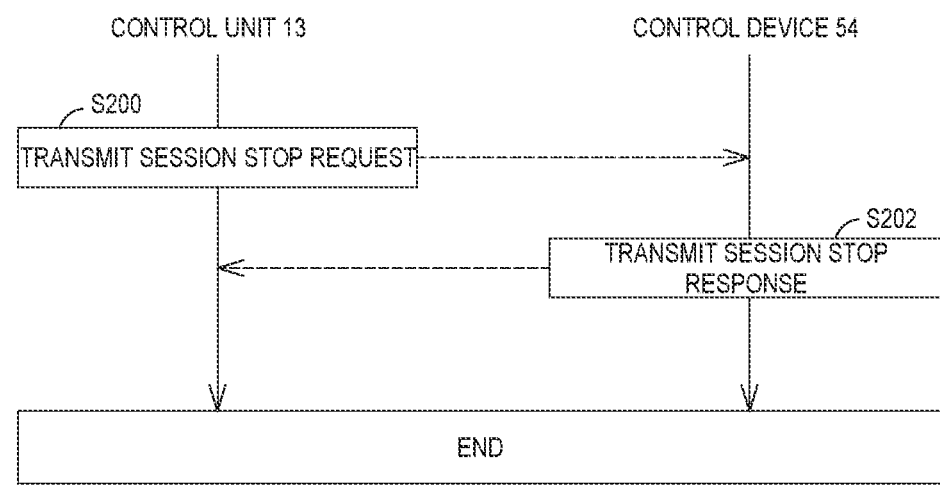

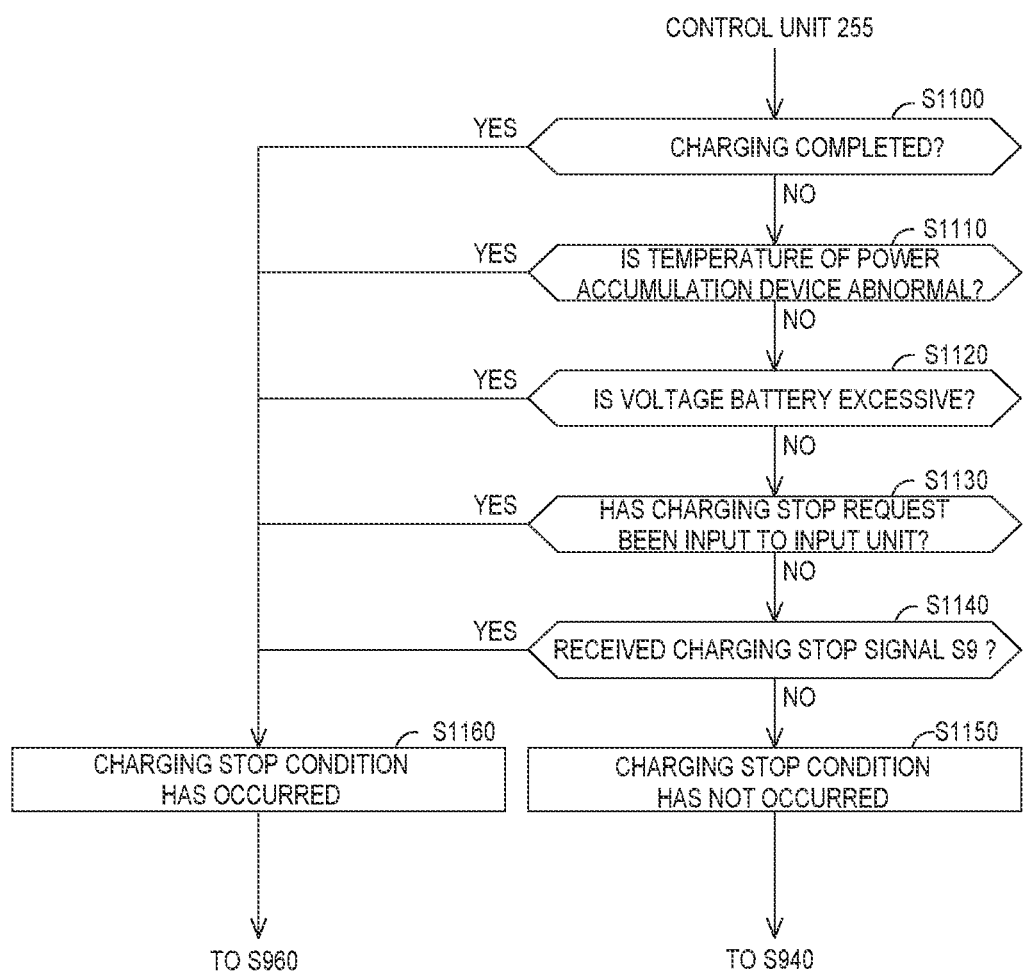

VEHICLE AND CHARGING SYSTEM

CROSS-REFERENCE TO RELATED APPLICATION

This application claims priority to Japanese Patent Application No. 2021-154001 filed on Sep. 22, 2021, incorporated herein by reference in its entirety.

BACKGROUND

1. Technical Field

The present disclosure relates to a vehicle and a charging system.

2. Description of Related Art

Various proposals have been made for a charging system in which a charging connector provided in a charging device is connected to a vehicle and a power accumulation device mounted on the vehicle is charged.

For example, in a charging system described in Japanese Unexamined Patent Application Publication No. 2013-085346, an emergency stop button is provided in a charging device. Then, a user can cause the charging device to stop charging by pressing the emergency stop button during the charging.

SUMMARY

However, in the charging system as above, a user who cannot use the charging device may not know where the charging stop button is provided when causing the charging device to stop the charging during the charging.

The present disclosure provides a vehicle and a charging system that enable a user to easily execute a charging stop operation during charging.

A first aspect of the present disclosure is a vehicle configured to receive power from a charging device provided outside. The vehicle includes an inlet unit to which a charging connector provided in the charging device is connected, a control unit configured to communicate with the charging device, a power accumulation device charged with power delivered through the charging connector, and an input unit to which a user makes an input. The control unit is configured to, upon determining that a charging stop request is input to the input unit during charging, stop the charging.

In the first aspect, the input unit may include at least one of an accelerator pedal, a brake pedal, an ignition switch, a hazard switch, and a door lock button. The control unit may determine, upon determining that a charging stop operation, set in advance, is executed on the input unit, that the charging stop request is input to the input unit.

In the first aspect, the charging stop operation may be a predetermined continuous operation to the input unit.

In the first aspect, the charging stop operation may be an operation of a door unlock button a plurality of number of times.

In the first aspect, the input unit may be a charging stop switch operable by the user.

A second aspect of the present disclosure is a charging system. The charging system includes a charging device including a charging connector, and a vehicle configured to receive power from the charging device. The vehicle includes an inlet unit to which a charging connector provided in the charging device is connected, a control unit configured to communicate with the charging device, a power accumulation device charged with power delivered through the charging connector, and an input unit to which a user makes an input. The control unit is configured to, upon determining that a charging stop request is input to the input unit during charging, transmit a request to stop the charging to the charging device.

With the vehicle and the charging system according to each aspect of the present disclosure, it is possible for a user to easily execute a charging stop operation during charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a control flow illustrating a pre-end stage;

FIG. 7 is a flowchart illustrating a charging end stage;

FIG. 20 is a specific flow for determining whether a charging stop condition of a control unit has occurred.

DETAILED DESCRIPTION OF EMBODIMENTS

A charging system and a vehicle according to the present embodiment will be described with reference to FIGS. 1 to 20. In the configurations illustrated in FIGS. 1 to 20, the same or substantially the same configurations are denoted by the same reference signs, and duplicated description thereof will be omitted. In the specification and the drawings, "S" means a "step".

First Embodiment

Figure 1:
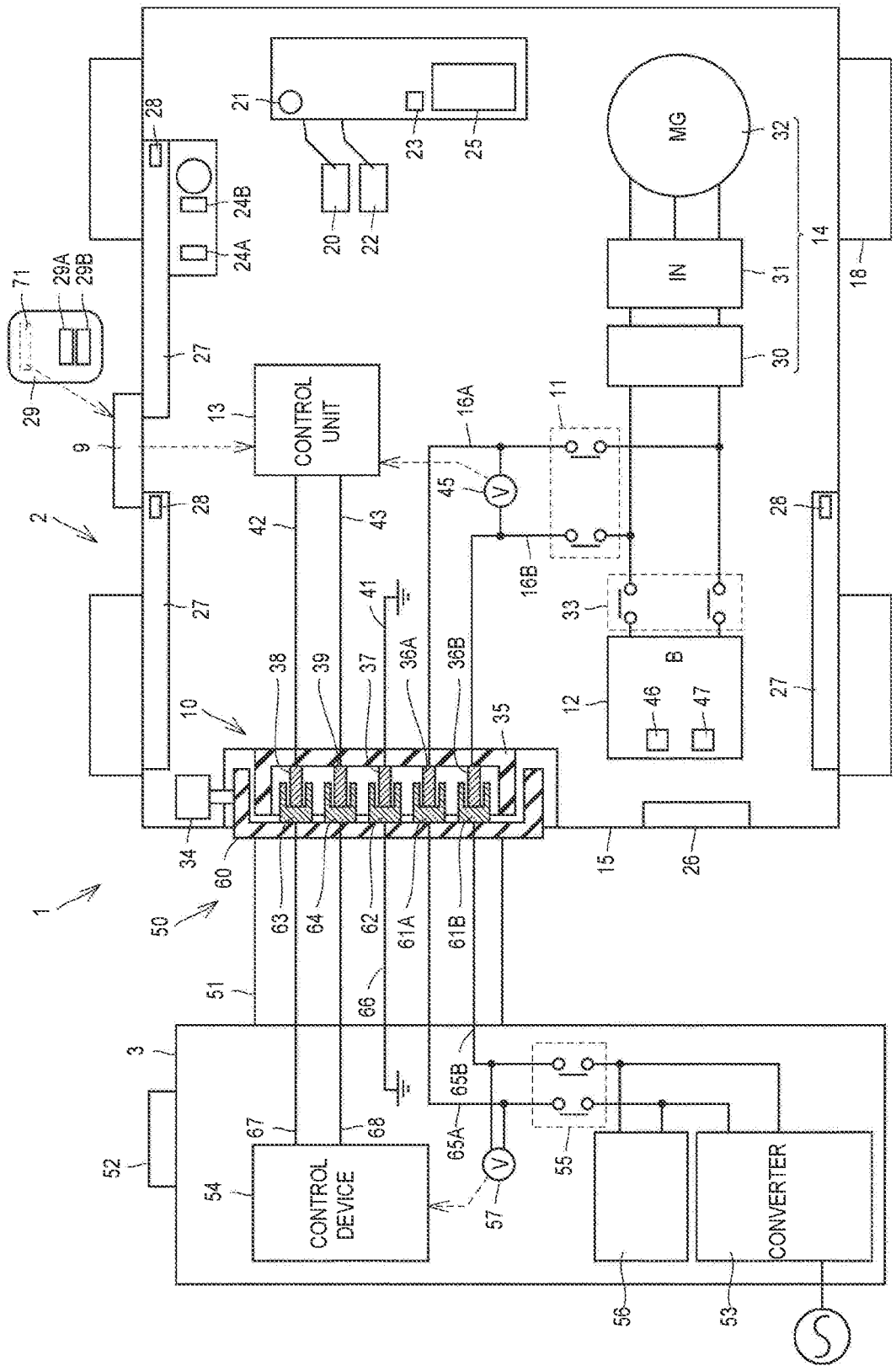
FIG. 1 is a schematic diagram schematically illustrating a charging system according to the present embodiment.

FIG. 1 is a schematic diagram schematically illustrating a charging system 1 according to the present embodiment. The charging system 1 includes a vehicle 2 and a charging device 3. The vehicle 2 includes a communication device 9, an inlet unit 10, a charging relay 11, a power accumulation device 12, a control unit 13, a driving device 14, a body 15, power wirings 16A, 16B, a ground wiring 41, a CP wiring 42, a PP wiring 43, a driving wheel 18, and an input unit.

The communication device 9 is configured to be able to communicate with an external server (not shown), a key 29 described below, or the like. The communication device 9 transmits received information to the control unit 13.

The power accumulation device 12 may be, for example, a rechargeable/dischargeable secondary battery or a large capacitor. The driving device 14 is connected to the power accumulation device 12. A current sensor 46 and a voltage sensor 47 are provided in the power accumulation device 12. The current sensor 46 measures an output current from the power accumulation device 12 and a charging current to the power accumulation device 12, and outputs a measured result to the control unit 13. The voltage sensor 47 measures voltage of the power accumulation device 12 and outputs a measured result to the control unit 13. The driving device 14 generates a driving force that drives the driving wheel 18 using power delivered from the power accumulation device 12. The driving device 14 includes, for example, a converter 30, an inverter 31, and a rotary electric machine 32. A system main relay (SMR) 33 is provided between the converter 30 and the power accumulation device 12.

A plurality of input units is provided in the vehicle 2. Examples of the input units include an accelerator pedal 20, an IG switch 21, a brake pedal 22, a hazard switch 23, a door lock button 24A, a door unlock button 24B, a display unit 25, and a key 29.

When starting the vehicle 2, a user presses the IG switch 21 while depressing the brake pedal 22. When the IG switch 21 is pressed while the brake pedal 22 is depressed, the control unit 13 starts the driving device 14 and the like.

When causing the vehicle 2 to travel, the user depresses the accelerator pedal 20. The control unit 13 controls driving of the driving device 14 such that the vehicle 2 accelerates at an acceleration corresponding to an accelerator opening degree of the accelerator pedal 20.

When decelerating the vehicle 2, the user depresses the brake pedal 22. The control unit 13 drives the driving device 14, or drives a brake provided on the driving wheel 18 or the like such that a braking force corresponding to an amount of depression of the brake pedal 22 is generated. When the user presses the hazard switch 23, a hazard lamp 26 blinks.

When locking a door 27, the user presses the door lock button 24A. When the door lock button 24A is pressed, a lock signal is transmitted from the door lock button 24A to the control unit 13. Upon receiving the lock signal, the control unit 13 drives the door lock 28 provided on each door 27 to lock the door 27.

When unlocking the door 27, the user presses the door unlock button 24B. When the door unlock button 24B is pressed, an unlock signal is transmitted from the door unlock button 24B to the control unit 13. Upon receiving the unlock signal, the control unit 13 releases the locking of the door 27 by the door lock 28.

Various pieces of information to be transferred to the user are displayed on the display unit 25, and the user can input various pieces of information to the display unit 25. For example, map information may be displayed or buttons and the like operated by the user may be displayed on the display unit 25.

Figure 2:
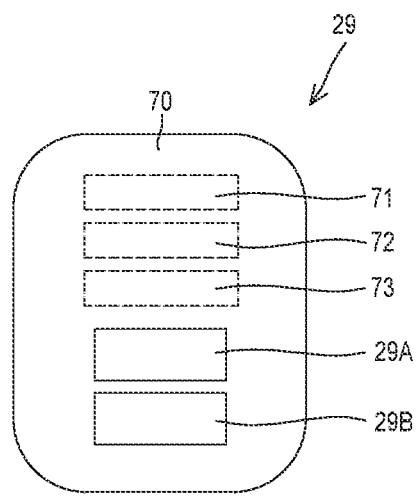
FIG. 2 is a perspective view schematically illustrating a key.

FIG. 2 is a perspective view schematically illustrating the key 29. The key 29 includes a main body 70, a communication unit 71, a battery 72, and a processing unit 73. The communication unit 71 communicates with the communication device 9 provided in the vehicle 2. The battery 72 delivers driving power to the communication unit 71 and the processing unit 73.

A releasing button 29A and a lock button 29B that can be operated by the user are provided on the main body 70. The releasing button 29A and the lock button 29B are provided on the key 29.

Returning to FIG. 1, when the user presses the releasing button 29A, a lock releasing signal is transmitted from the communication unit 71 to the communication device 9. When the communication device 9 receives the lock releasing signal, the control unit 13 releases the locking by the door lock 28. When the user presses the lock button 29B, a lock signal is transmitted from the communication unit 71 to the communication device 9. When the communication device 9 receives the lock signal, the control unit 13 causes the door lock 28 to lock the door 27.

The inlet unit 10 includes a lock device 34, a housing 35, a DC terminal 36A, a DC terminal 36B, a PE terminal 37, a control pilot (CP) terminal 38, a proximity pilot (PP) terminal 39, and a voltage sensor 45.

The lock device 34 is used for locking, to the inlet unit 10, a charging connector 50 connected to the inlet unit 10.

The power wirings 16A, 16B are connected to the DC terminals 36A, 36B, respectively. A charging relay 11 is provided on the power wirings 16A, 16B. The DC terminals 36A, 36B are connected to the power accumulation device 12 through the power wirings 16A, 16B, the charging relay 11, and the SMR 33.

A ground wiring 41 is connected to the PE terminal 37. The CP wiring 42 is connected to the CP terminal 38, and the PP wiring 43 is connected to the PP terminal 39. The CP wiring 42 and the PP wiring 43 are connected to the control unit 13.

The voltage sensor 45 measures voltage between the power wirings 16A and 16B, and the voltage sensor 45 transmits a measured result to the control unit 13.

The charging device 3 includes a charging connector 50, a charging cable 51, a communication device 52, a converter 53, a control device 54, a relay 55, an insulation check circuit 56, and a voltage sensor 57.

The charging connector 50 includes a housing 60, a DC terminal 61A, a DC terminal 61B, a PE terminal 62, a CP terminal 63, and a PP terminal 64. Power wirings 65A, 65B are connected to the DC terminals 61A, 61B, respectively, the power wirings 65A, 65B are connected to the relay 55, and the relay 55 is connected to the converter 53.

The voltage sensor 57 is connected to the power wiring 65A and the power wiring 65B. The voltage sensor 57 measures voltage between the power wiring 65A and the power wiring 65B, and the voltage sensor 57 transmits a measured result to the control device 54.

The converter 53 is connected to a power supply provided outside. The converter 53 converts alternating current power delivered from the power supply into direct current power, and outputs it.

The insulation check circuit 56 is connected to the power wiring 65A and the power wiring 65B, and checks insulation.

A PE wiring 66 is connected to the PE terminal 62. A CP wiring 67 is connected to the CP terminal 63. A PP wiring 68 is connected to the PP terminal 64. The PE wiring 66 is grounded. The CP wiring 67 and the PP wiring 68 are connected to the control device 54.

Figure 3:
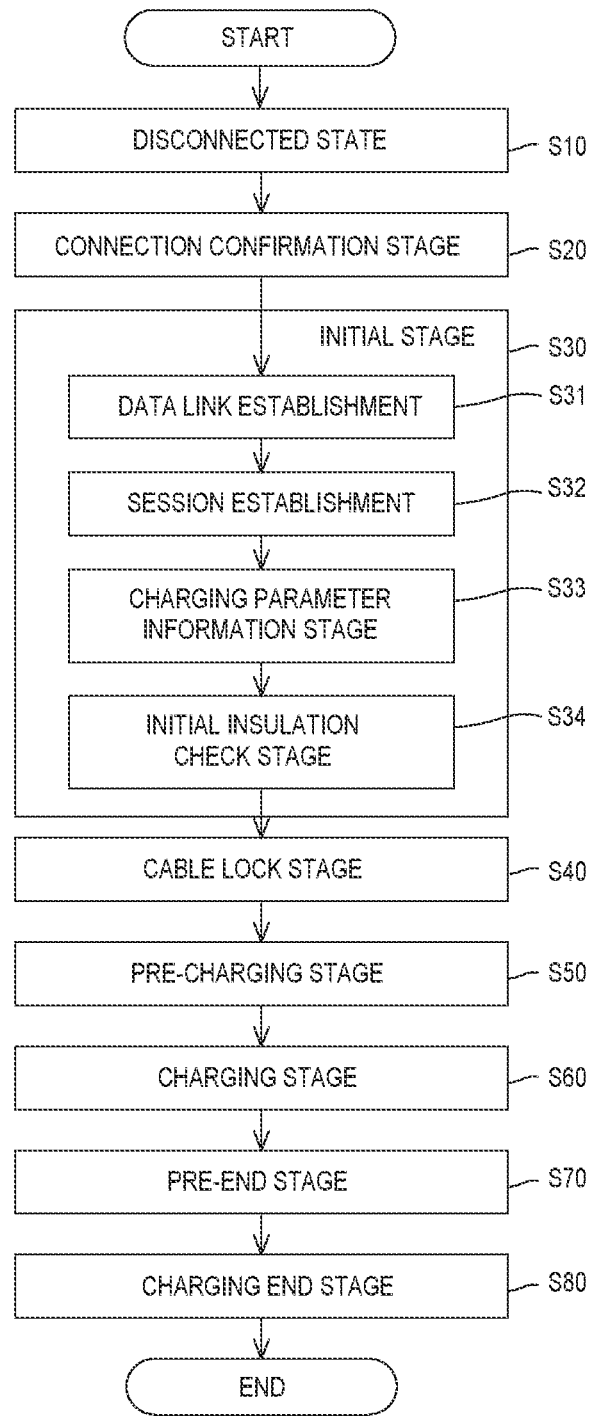
FIG. 3 is a flowchart illustrating a charging flow at a time of charging a power accumulation device of a vehicle.

FIG. 3 is a flowchart illustrating a charging flow when charging the power accumulation device 12 of the vehicle 2. The charging flow includes a disconnected state (S10), a connection confirmation stage (S20), an initial stage (S30), a cable lock stage (S40), a pre-charging stage (S50), a charging stage (S60), a pre-end stage (S70), and a charging end stage (S80).

With reference to FIGS. 3 and 1, the disconnected state (S10) is a state where the charging connector 50 is not connected to the inlet unit 10. At this time, the charging relay 11 is in the OFF state, and the relay 55 is also in the OFF state.

The connection confirmation stage (S20) is a state where the inlet unit 10 is connected to the charging connector 50. At this time, the PE terminal 37 is connected to the PE terminal 62. The CP terminal 38 is connected to the CP terminal 63. The PP terminal 39 is connected to the PP terminal 64. The DC terminals 36A, 36B are connected to the DC terminals 61A, 61B, respectively.

Here, by connecting the CP terminal 38 to the CP terminal 63, the control unit 13 and the control device 54 start PWM communication by pulse width modulation (PWM).

Then, the control unit 13 and the control device 54 detect, based on voltage, a duty, and the like of the PWM signal, the fact that the inlet unit 10 is connected to the charging connector 50. For example, while the inlet unit 10 is not connected to the charging connector 50, the voltage of the PWM signal is 12 V (State A), and when the inlet unit 10 is connected to the charging connector 50, the voltage becomes 9 V (State B).

When the inlet unit 10 is connected to the charging connector 50 and the voltage becomes 9 V, the initial stage (S30) is reached.

The initial stage (S30) includes a data link establishment (S31), a session establishment (S32), a charging parameter information stage (S33), and an initial insulation check stage (S34).

In the data link establishment (S31), a duty ratio of the PWM signal becomes 5%, and high-level communication (PLC communication) is started between the control unit 13 and the control device 54 through the CP terminal 38 and the CP terminal 63. As such, a data link is established between the control unit 13 and the control device 54. After the data link is established, the control unit 13 acquires an IP address of the charging device 3.

In the session establishment (S32), the control unit 13 transmits a V2G session start request (Session Setup Req) to the control device 54, and the control device 54 replies with a V2G session start response (Session Setup Res). As such, a V2G session of the control unit 13 and the control device 54 is established.

In the charging parameter information stage (S33), information on charging service information is exchanged between the control unit 13 and the control device 54.

For example, the control unit 13 transmits a charging parameter request to the control device 54. The charging parameter request includes request information, such as a charging state, a charging method, a permissible charging current value, a power amount, and a voltage value. The control device 54 transmits a charging parameter response to the control unit 13. The charging parameter response includes response information indicating, for example, the maximum delivery current value, a voltage value, and the maximum power amount. Then, the control unit 13 drives the lock device 34 to lock the charging connector 50 to the inlet unit 10. The control unit 13 and the control device 54 set a charging parameter based on the charging parameter request and the charging parameter response.

In the initial insulation check stage (S34), the control unit 13 transmits a check request to the control device 54. Upon receiving the check request, the control device 54 determines whether the power wirings 65A, 65B, and the like are insulated based on a measured value of the voltage sensor 57. At this time, the charging relay 11 and the relay 55 are in the OFF state. In this state, when voltage between the power wirings 65A and 65B is smaller than 60 V, the control device 54 determines that the insulation is secured. Then, the control device 54 transmits a check response to the control unit 13.

On the other hand, upon determining that the insulation is not secured, the control device 54 stores information indicating that the insulation is not secured in the check response. In this case, the V2G session ends and the charging flow ends.

Then, when the control device 54 determines that the insulation is secured, the control unit 13 changes the voltage of the PWM signal applied to the CP terminals 38, 63 from 9 V (State B) to 6 V (State C).

In the cable lock stage (S40), the control unit 13 transmits a cable lock request to the control device 54. Upon receiving the cable lock request, the control device 54 checks, using the insulation check circuit 56, whether the insulation is secured by the charging relay 11 and the relay 55.

The control device 54 transmits a cable check response to the control unit 13. Upon determining that the insulation is not secured, the control device 54 stores information indicating that the insulation is not secured in the cable check response. In this case, the V2G session ends and the charging flow ends. On the other hand, upon determining that the insulation is secured, the control device 54 stores information indicating that the insulation is secured in the cable check response.

In the pre-charging stage (S50), the control unit 13 turns on the charging relay 11. The control device 54 turns on the relay 55. Then, the control unit 13 transmits a pre-charging request to the control device 54. The pre-charging request stores information indicating a requested voltage and a requested current. Upon receiving the pre-charging request, the control device 54 drives the converter 53. As such, the direct current power is delivered from the charging device 3 to the vehicle 2.

The control device 54 transmits a pre-charging response to the control unit 13. The pre-charging response includes information indicating an output voltage and an output current from the converter 53.

Then, the control unit 13 determines whether the pre-charging is suitably executed based on the information included in the pre-charging request. When the control unit 13 determines that the pre-charging is not suitably executed, the V2G session ends and the charging flow ends.

In the charging stage (S60), various pieces of information are exchanged between the control unit 13 and the control device 54. Then, direct current power is delivered from the charging device 3 to the vehicle 2, and the power accumulation device 12 is charged. The control unit 13 calculates a state-of-charge (SOC) of the power accumulation device 12 based on information acquired from the current sensor 46 and the voltage sensor 47 provided in the power accumulation device 12. When the SOC of the power accumulation device 12 becomes a target SOC, the charging ends. For example, the target SOC is a full SOC or a set SOC set by the user. In the charging stage (S60), an insulation diagnosis of the charging relay 11 and the relay 55 is executed. When welding of the charging relay 11 and the relay 55 has been detected, the charging is stopped. Further, upon determining that a charging stop request from the user has been input to the vehicle 2, the control unit 13 stops the charging.

Figure 4:
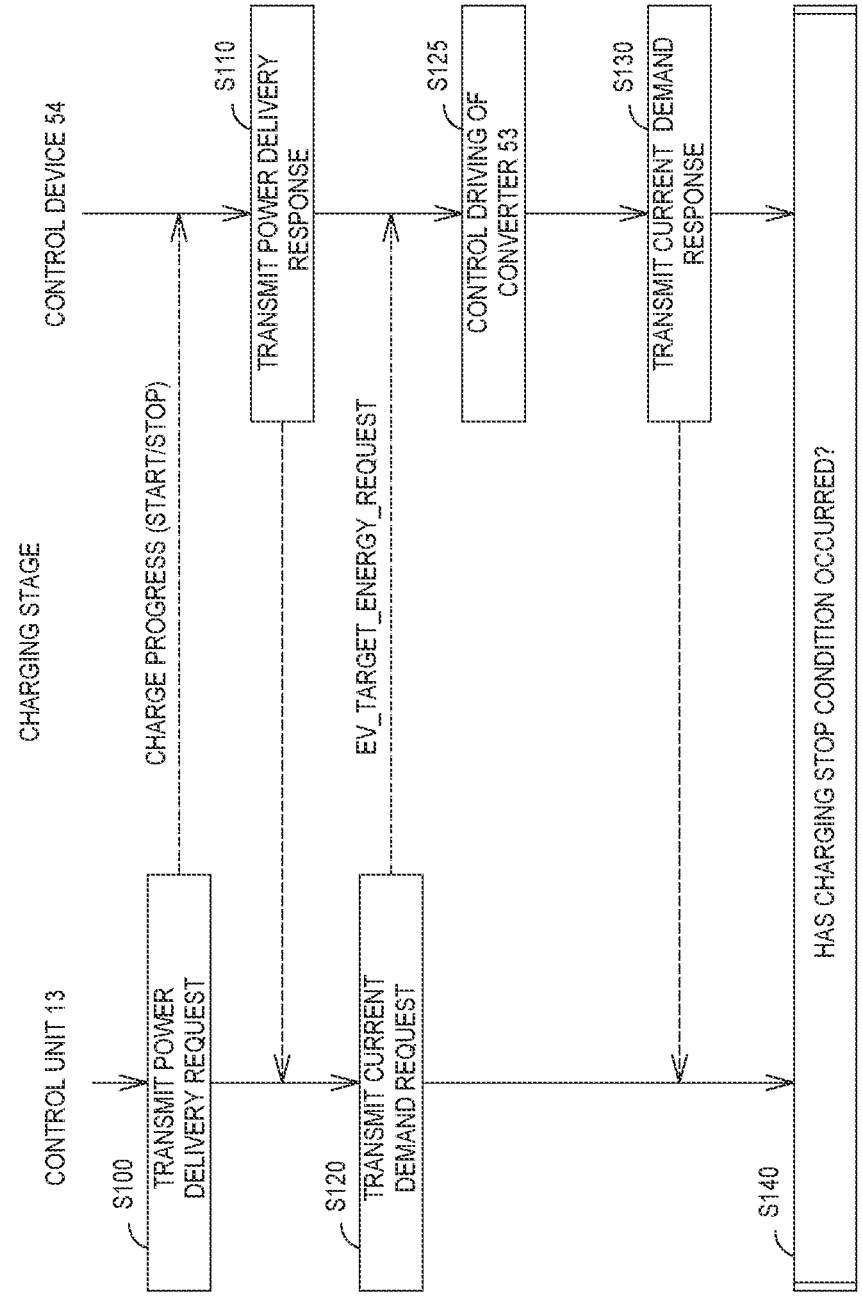
FIG. 4 is a flowchart illustrating a charging stage.

FIG. 4 is a flowchart illustrating the charging stage (S60). The charging stage (S60) is a stage where direct current power is delivered from the charging device 3 to the vehicle 2, and the power accumulation device 12 is charged.

The control unit 13 transmits a power delivery request to the control device 54 (S100). The power delivery request includes charging progress information. The charging progress includes "start" indicating start/continuation of the charging and "stop" indicating end of the charging.

Upon receiving the power delivery request from the control unit 13, the control device 54 replies with a power delivery response (Power Delivery Res) (S110).

The power delivery response includes state information indicating a driving state of the charging device 3. The state information indicates a state, such as whether the power delivery is being executed or is stopped.

After transmitting the power delivery request, the control unit 13 transmits a current demand request (Current_Demand_Req) to the control device 54 (S120). The current demand request stores information indicating at least one of a demanded target power (EV_Target_Energy_Request), the maximum power demand, the minimum power demand, the maximum charging power, the maximum charging current, and the maximum voltage. When the control unit 13 stops the charging, the demanded target power is set to "0".

The control device 54 controls the driving of the converter 53 such that the output power that is output from the converter 53 becomes the demanded target power (S125).

Upon receiving the current demand request, the control device 54 replies with a current demand response (S130). The current demand response (Current_Demand_Res) includes information on an output voltage and an output current from the control device 54.

The control unit 13 and the control device 54 determine whether a charging stop condition has occurred (S140).

Figure 5:
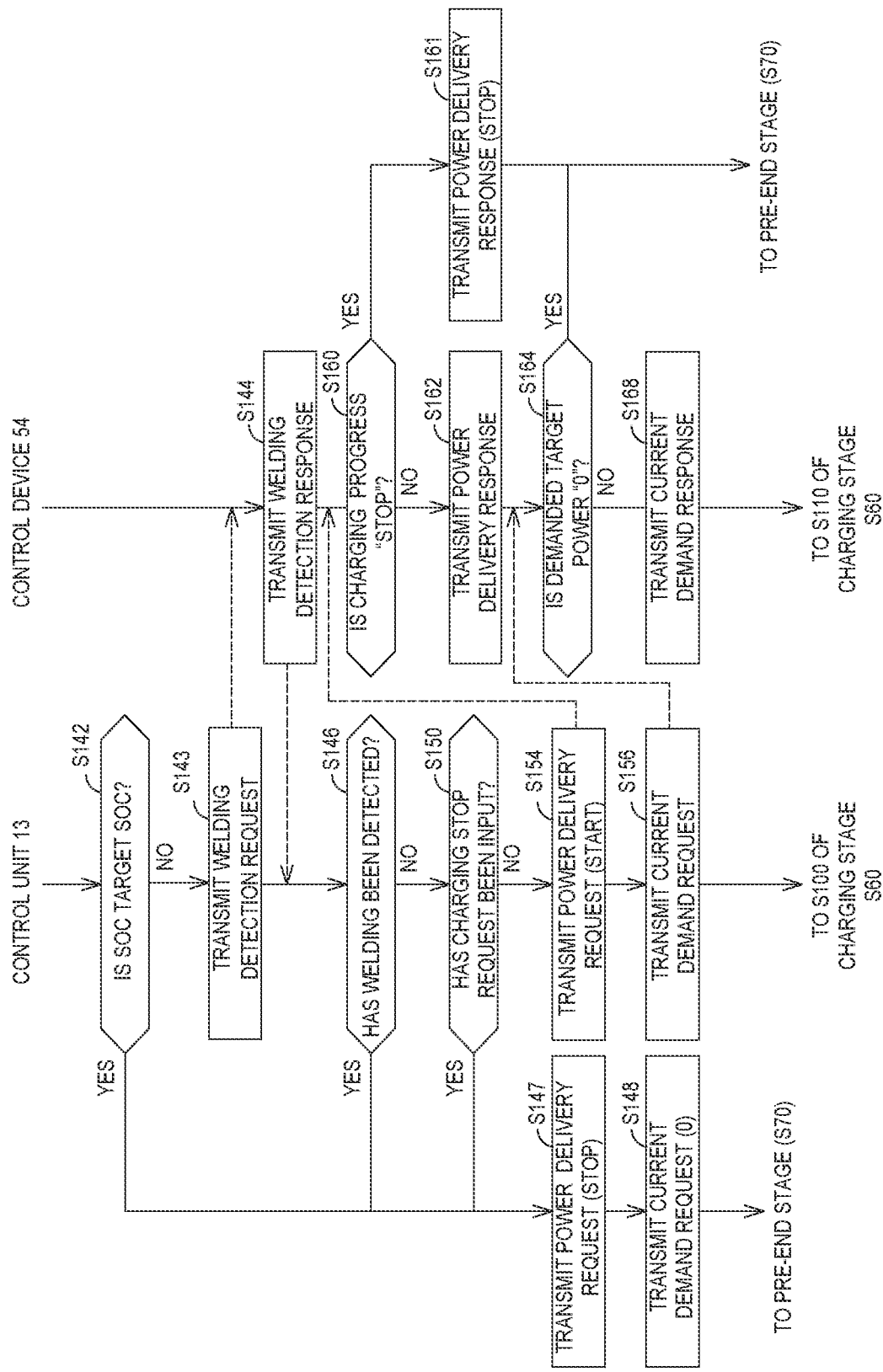
FIG. 5 is a control flow for determining whether a charging stop condition has occurred.

FIG. 5 is a control flow used for determining whether a charging stop condition has occurred. The charging stop condition includes "charging completion", "welding detection", and "user stop".

The charging completion indicates that the SOC of the power accumulation device 12 has reached the target SOC. The welding detection indicates that welding of the charging relay 11 or the relay 55 has been detected. The user stop indicates that the charging stop request by the user has been input to the input unit.

The control unit 13 determines whether the SOC of the power accumulation device 12 has reached the target SOC (S142). Upon determining that the SOC of the power accumulation device 12 has reached the target SOC (Yes in S142), the control unit 13 transmits the power delivery request (S147). The charging progress of the power delivery request stores "stop", indicating the end of the charging. Then, the control unit 13 transmits the current demand request (S148). The demanded target power of the current demand request is set to "0". Then, the control unit 13 moves to the pre-end stage (S70) described below.

On the other hand, upon determining that the SOC of the power accumulation device 12 has not reached the target SOC (No in S142), the control unit 13 transmits a welding detection request (Welding Detection Req) to the control device 54 (S143). Then, upon receiving the welding detection request, the control device 54 transmits a welding detection response (Welding Detection Response) to the control unit 13 (S144). The welding detection response includes information indicating the output voltage and the like. The welding detection response may include an insulation check result by the insulation check circuit 56. The control unit 13 can determine whether the charging relay 11 and the relay 55 are welded based on the received welding detection response. The control unit 13 determines whether welding has been detected (S146).

Upon determining that the welding has been detected (Yes in S146), the control unit 13 transmits the power delivery request (S147). The charging progress of the power delivery request stores "stop", indicating the end of the charging. Then, the control unit 13 transmits the current demand request (S148). The demanded target power of the current demand request is set to "0". Then, the control unit 13 moves to the pre-end stage (S70) described below.

On the other hand, upon determining that the welding has not been detected (No in S146), the control unit 13 determines whether the charging stop request by the user has been input to the input unit (S150). The specific content where the charging stop request by the user has been input to the input unit will be described below.

Upon determining that the charging stop request has been input to the input unit (Yes in S150), the control unit 13 transmits the power delivery request (S147). The charging progress of the power delivery request stores "stop", indicating the end of the charging. Then, the control unit 13 transmits the current demand request (S148). The demanded target power of the current demand request is set to "0". Then, the control unit 13 moves to the pre-end stage (S70) described below.

On the other hand, upon determining that the charging stop request by the user has not been input to the input unit (No in S150), the control unit 13 transmits the power delivery request (S154). The charging progress of the power delivery request stores "stop", indicating the end of the charging.

Then, the control unit 13 transmits the current demand request (S156). A numerical value other than "0" is stored in the demanded target power of the current demand request. Specifically, a power value set by the control unit 13 for charging the power accumulation device 12 is stored. Then, the control unit 13 returns to S100 of the charging stage.

The control device 54 determines whether "stop" is stored in the charging progress of the received power delivery request (S160).

Upon determining that "stop" is stored in the charging progress (Yes in S160), the control device 54 transmits a power delivery response to the control unit 13 (S161) and moves to the pre-end stage (S70).

On the other hand, upon determining that "stop" is not stored in the charging progress (No in S160), the control device 54 transmits the power delivery response to the control unit 13 (S162). Then, the control device 54 determines whether the demanded target power of the received current demand request is set to "0" (S164).

Upon determining that the demanded target power is set to "0" (Yes in S164), the control device 54 moves to the pre-end stage (S70). On the other hand, upon determining that the demanded target power is not set to "0" (No in S164), the control device 54 replies with the current demand response (S168) and returns to S110 of the charging stage.

FIG. 6 is a flowchart illustrating the pre-end stage (S70). In the pre-end stage (S70), the control device 54 stops driving the converter 53 (S180). Then, the control device 54 replies with the current demand response (S182). The current demand response stores information indicating the output current, such as 0 A. Further, the current demand response stores information indicating the output voltage, such as 0 V.

After receiving the current demand response, the control unit 13 turns off the charging relay 11 (S190). The control unit 13 transmits a disconnect charging device request (Disconnect Charging Device Request) (S192). The disconnect charging device request includes, for example, information indicating a state (ON/OFF) of the charging relay 11.

Upon receiving the disconnect charging device request from the control unit 13, the control device 54 disconnects the relay 55 (S184). Then, the control device 54 transmits a disconnect charging device response (Disconnect Charging Device Res) to the control unit 13 (S186). The disconnect charging device response includes, for example, information indicating a state (ON/OFF) of the charging relay 55.

Then, upon receiving the disconnect charging device response, the control unit 13 releases the locking of the charging connector 50 by the lock device 34 (S194).

FIG. 7 is a flowchart illustrating the charging end stage (S80). The control unit 13 transmits a session stop request (Session Stop Request) (S200). Upon receiving the session stop request, the control device 54 transmits a session stop response (Session Stop Res) to the control unit 13 (S202).

As such, communication between the control unit 13 and the control device 54 ends, and the charging flow ends.

In the embodiment, in FIG. 5, when the charging stop request by the user is input to the input unit (Yes in S150), the control unit 13 and the control device 54 move to the pre-end stage (S70), and, as a result, the charging ends. As such, even during the charging, the charging can be stopped at the will of the user.

Here, the charging stop request by the user to the input unit means that the user requests the vehicle 2 to stop the charging by executing a predetermined operation on the input unit. As the "predetermined operation on the input unit", at least one of various operations exemplified below can be employed.

For example, in FIG. 2, examples of the "predetermined operation on the input unit" can include an "operation of continuously pressing the releasing button 29A a plurality of number of times". Alternatively, the examples of the "predetermined operation on the input unit" can include an "operation of continuously pressing the lock button 29B a plurality of number of times". The number of times may be, for example, three times.

Here, the releasing button 29A is an input unit used when the locking is released by the door lock 28. For this reason, it is easy to connect the releasing button 29A with an image when releasing the locking of the lock device 34. For this reason, as the "predetermined operation on the input unit", when the "operation of continuously pressing the releasing button 29A a plurality of number of times" is employed, it is easy for the user to remember the operation.

In FIG. 1, the examples of the "predetermined operation on the input unit" can include an "operation of continuously pressing the door lock button 24A a plurality of number of times". Further, the examples of the "predetermined operation on the input unit" can include an "operation of continuously pressing the door unlock button 24B a plurality of number of times".

Here, the door unlock button 24B is an input unit used when releasing the locking by the door lock 28. For this reason, it is easy to connect the door unlock button 24B with an image when releasing the locking of the lock device 34. For this reason, as the "predetermined operation on the input unit", when the "operation of continuously pressing the door unlock button 24B a plurality of number of times" is employed, it is easy for the user to remember the operation.

As such, when "a plurality of operations is executed" is employed as the "predetermined operation on the input unit", it is possible to prevent the user from mistakenly executing the operation to stop the charging.

In the above examples, a plurality of operations is executed on one input unit, and the operations themselves are relatively easy. For this reason, even when the user is anxious, such as in an emergency, the user can execute the operations.

Further, since the user can stop the charging by the input unit provided in the vehicle 2, it is possible to stop the charging even when a charging stop button or the like is not provided in the charging device 3.

The examples of the "predetermined operation on the input unit" can include "an operation of continuously pushing at least one of the accelerator pedal 20, the IG switch 21, the brake pedal 22, the hazard switch 23, the door lock button 24A, and the door unlock button 24B" a plurality of number of times.

Specifically, the examples of the "predetermined operation on the input unit" can include executing a series of operations, such as "pressing the IG switch 21 to turn it on", "pressing the IG switch 21 to turn it off", "pressing the IG switch 21 to turn it on", "pressing the IG switch 21 to turn it off", "pressing the IG switch 21 to turn it on", "depressing the accelerator pedal 20 twice", and "pressing the IG switch 21 to turn it off".

In the above examples, it is possible to prevent the user from mistakenly executing the operation to stop the charging.

Alternatively, the examples of the "predetermined operation on the input unit" can include pressing a charging stop button by the user to stop the charging.

Figure 8:
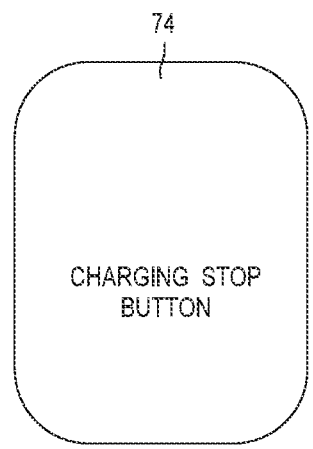
FIG. 8 is a schematic diagram illustrating a charging stop button.

FIG. 8 is a schematic diagram illustrating a charging stop button 74. The charging stop button 74 is attached to, for example, a dashboard in a vehicle cabin. Then, when the charging stop button 74 is pressed, the control unit 13 determines that the "predetermined operation on the input unit" is executed.

Figure 9:
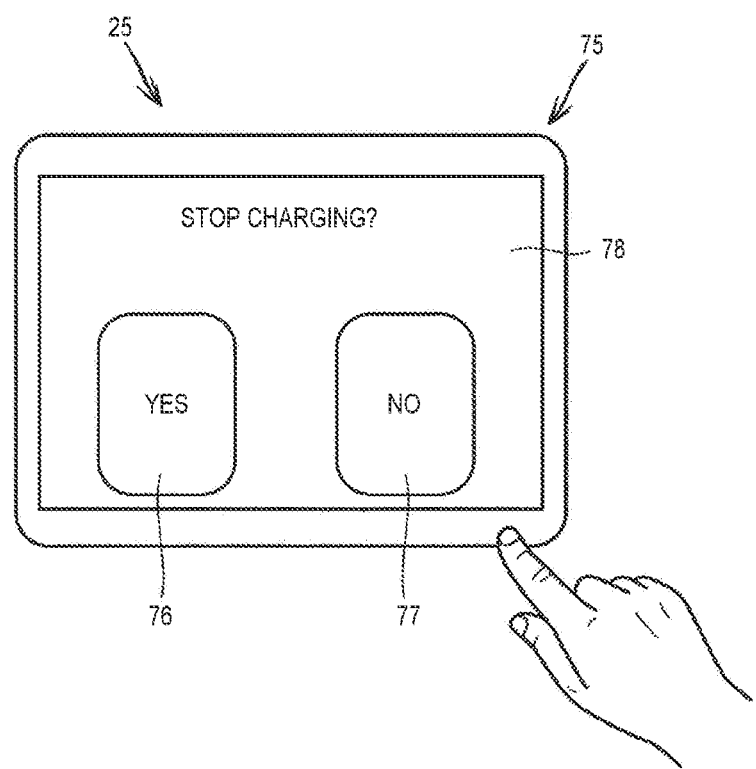
FIG. 9 is a schematic diagram schematically illustrating a stop icon displayed on a display unit.

FIG. 9 is a schematic diagram schematically illustrating a stop icon 75 displayed on the display unit 25. The display unit 25 includes a display screen 78. The stop icon 75 is displayed on the display screen 78.

The stop icon 75 includes a display button 76 and a display button 77. Then, when the user presses the display button 76, the control unit 13 determines that the "predetermined operation on the input unit" is executed. In the example, since the operation is very simple for the user, the user can easily stop the charging.

Second Embodiment

Figure 10:
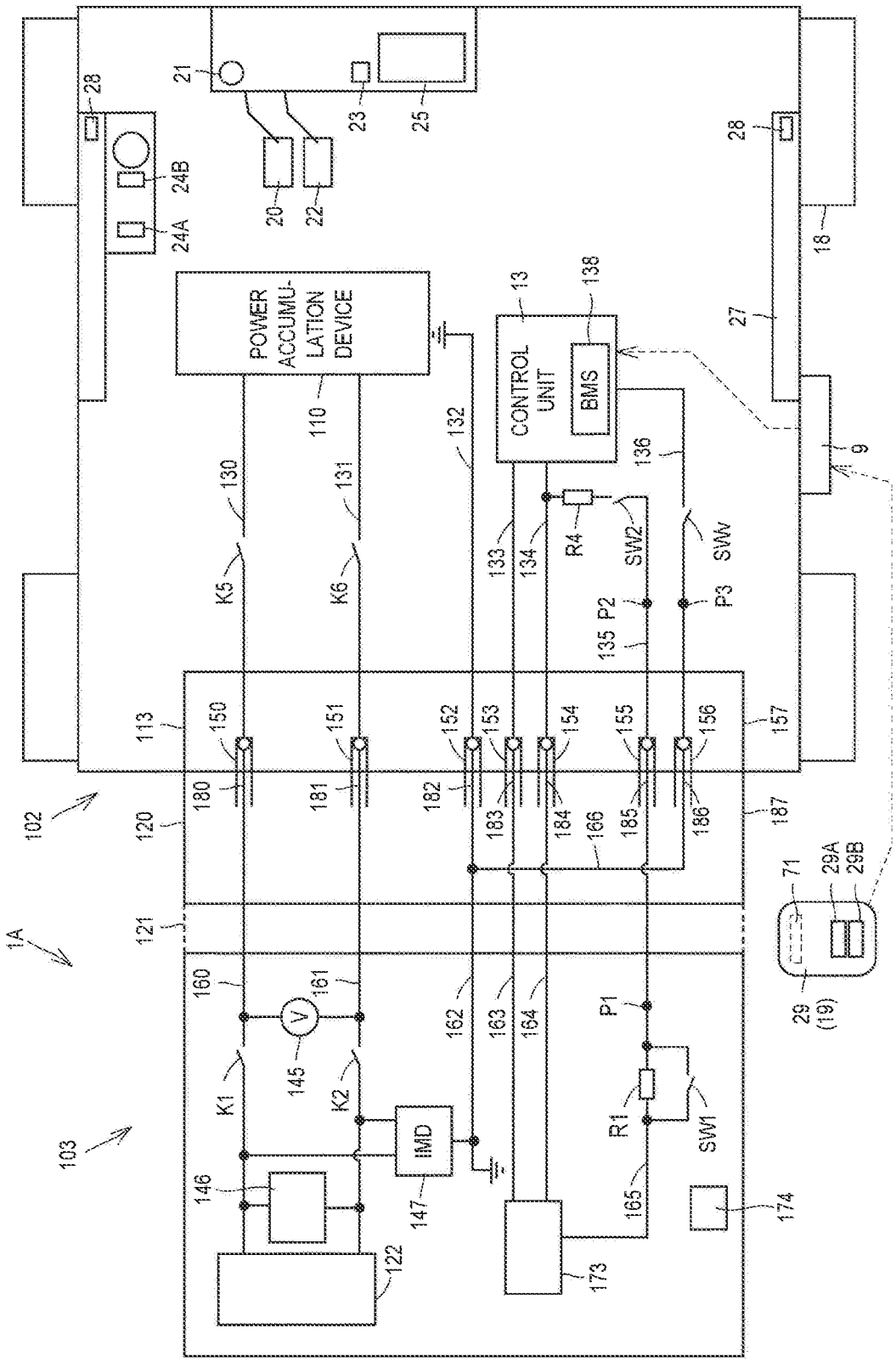
FIG. 10 is a schematic diagram schematically illustrating a charging system according to a second embodiment.

A charging system 1A according to a second embodiment will be described with reference to FIG. 10 and the like. FIG. 10 is a schematic diagram schematically illustrating the charging system 1A. The charging system 1A includes a vehicle 102 and a charging device 103.

The vehicle 102 includes a power accumulation device 110, a charging inlet 113, and the control unit 13. The charging inlet 113 includes a DC(+) terminal 150, a DC(−) terminal 151, a PE terminal 152, an S(+) terminal 153, an S(−) terminal 154, a CC1 terminal 155, a CC2 terminal 156, and a housing 157. Each of the terminals 150 to 156 is housed in the housing 157, and each terminal is insulated.

The vehicle 102 includes the control unit 13, a DC(+) wiring 130, a DC(−) wiring 131, a PE line 132, an S(+) signal line 133, an S(−) signal line 134, a CC1 communication line 135, a CC2 communication line 136, contactors K5, K6, and switches SW2, SWv.

The DC(+) wiring 130 and the DC(−) wiring 131 are connected to the power accumulation device 110. The DC(+) wiring 130 is connected to the DC(+) terminal 150, and the DC(−) wiring 131 is connected to the DC(−) terminal 151. The PE line 132 is a ground line and is connected to the PE terminal 152.

The S(+) signal line 133, the S(−) signal line 134, the CC1 communication line 135, and the CC2 communication line 136 are connected to the control unit 13. The S(+) signal line 133 is connected to the S(+) terminal 153, and the S(−) signal line 134 is connected to the S(−) terminal 154. The CC1 communication line 135 is connected to the CC1 terminal 155, and the CC2 communication line 136 is connected to the CC2 terminal 156.

The contactor K5 is provided on the DC(+) wiring 130 and the contactor K6 is provided on the DC(−) wiring 131. A resistor R4 is provided on the CC1 communication line 135, and the switch SW2 and the resistor R4 are connected to the CC1 communication line 135 in series. The switch SWv is provided on the CC2 communication line 136. The control unit 13 executes a switching control of ON/OFF of the contactors K5, K6 and the switches SW2, SWv.

A battery management system (BMS) 138 is provided in the control unit 13. In the same manner as in the vehicle 2 according to the first embodiment, the vehicle 102 includes a plurality of input units. In the vehicle 102, examples of the input units also include the accelerator pedal 20, the IG switch 21, the brake pedal 22, the hazard switch 23, the door lock button 24A, the door unlock button 24B, the display unit 25, and the key 29.

The charging device 103 includes a charger 122, a DC(+) wiring 160, a DC(−) wiring 161, a PE line 162, an S(+) signal line 163, an S(−) signal line 164, a CC1 communication line 165, a CC2 communication line 166, a contactor K1, a contactor K2, a switch SW1, a voltage measurement device 145, a bleeder circuit 146, an insulation monitoring device (IMD) 147, a charger controller 173, and a stop button 174.

A plug (a charging connector) 120 includes a DC(+) terminal 180, a DC(−) terminal 181, a PE terminal 182, an S(+) terminal 183, an S(−) terminal 184, a CC1 terminal 185, a CC2 terminal 186, and a housing 187. Each terminal is housed in the housing 187.

The DC(+) wiring 160 and the DC(−) wiring 161 are connected to the charger 122. The DC(+) wiring 160 is connected to the DC(+) terminal 180, and the DC(−) wiring 161 is connected to the DC(−) terminal 181. The PE line 162 is a ground wiring, and the PE line 162 is connected to the PE terminal 182.

The S(+) signal line 163, the S(−) signal line 164, and the CC1 communication line 165 are connected to the charger controller 173. The S(+) signal line 163 is connected to the S(+) terminal 183, and the S(−) signal line 164 is connected to the S(−) terminal 184.

The CC1 communication line 165 is connected to the CC1 terminal 185. One end of the CC2 communication line 166 is connected to the PE line 162, and the other end thereof is connected to the CC2 terminal 186.

The contactor K1 is provided on the DC(+) wiring 160, and the contactor K2 is provided on the DC(−) wiring 161. A resistor R1 is provided on the CC1 communication line 165, and the switch SW1 and the resistor R1 are connected to the CC1 communication line 165 in parallel.

The voltage measurement device 145 is provided so as to connect the DC(+) wiring 160 to the DC(−) wiring 161. Specifically, it is connected between the DC(+) terminal 180 and the contactor K1 on the DC(+) wiring 160 and between the DC(−) terminal 181 and the contactor K2 on the DC(−) wiring 161.

The IMD 147 is provided between the charger 122 and the contactors K1, K2, so as to connect the DC(+) wiring 160 to the DC(−) wiring 161. Further, the IMD 147 is also connected to the PE line 162. The bleeder circuit 146 is provided between the charger 122 and the contactors K1, K2 so as to connect the DC(+) wiring 160 to the DC(−) wiring 161.

In a state where the plug 120 is connected to the charging inlet 113, the DC(+) terminal 150 is connected to the DC(+) terminal 180, and the DC(−) terminal 151 is connected to the DC(−) terminal 181. The PE terminal 152 is connected to the PE terminal 182, and the S(+) terminal 153 is connected to the S(+) terminal 183. The S(−) terminal 154 is connected to the S(−) terminal 184, and the CC1 terminal 155 is connected to the CC1 terminal 185. The CC2 terminal 156 is connected to the CC2 terminal 186.

The control unit 13 periodically monitors detection points P2, P3, and the charger controller 173 periodically monitors a detection point P1.

The charger controller 173 executes the switching control of ON/OFF of the charger 122 and the switch SW1, and the switching control of ON/OFF of the contactors K1, K2. The stop button 174 is provided on the charging device 103, and is pressed when, for example, the user stops the charging. When the stop button 174 is pressed, the charger controller 173 stops the charging.

The control unit 13 executes the switching control of ON/OFF of the switch SW2 and the switch SWv, and the switching control of ON/OFF of the contactors K5, K6.

When the plug 120 is connected to the charging inlet 113 as above, various controls for executing the charging are executed.

Figure 11:
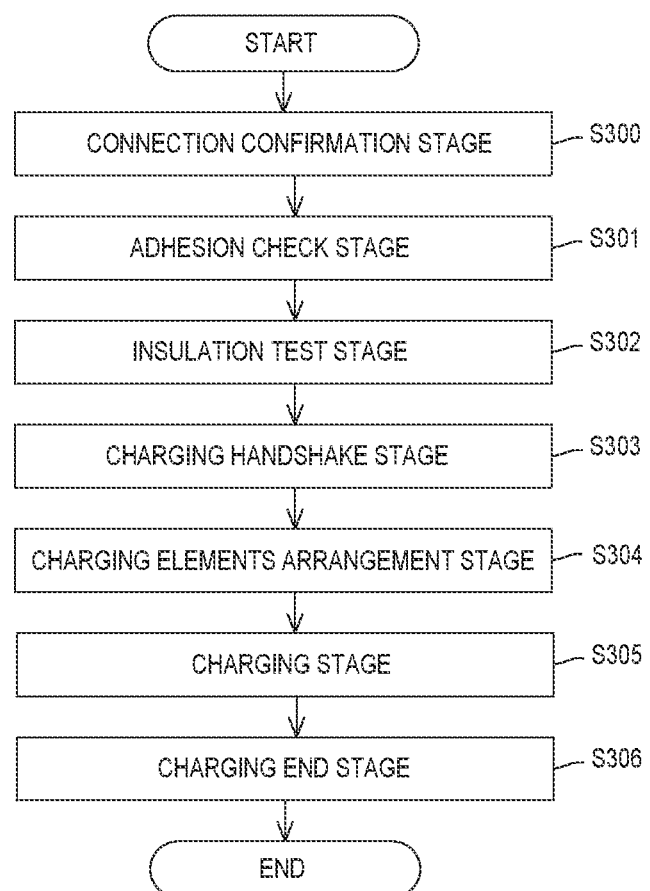
FIG. 11 is a flowchart illustrating an overview of a charging flow.

FIG. 11 is a flowchart illustrating an overview of a charging flow. In FIG. 11, the charging flow includes a connection confirmation stage (S300), an adhesion check stage (S301), an insulation test stage (S302), a charging handshake stage (S303), a charging elements arrangement stage (S304), a charging stage (S305), and a charging end stage (S306).

Here, in the connection confirmation stage, whether the charging inlet 113 is connected to the plug 120 is confirmed.

In FIG. 10, in a disconnected state T0 (a state where the charging inlet 113 is not connected to the plug 120), the switches SW1, SW2, SWv, the contactors K1, K2, and the contactors K5, K6 are in the open state. At this time, the voltage of the detection point P1 may be, for example, 12 V. The voltage of the detection point P2 is 0 V.

In a connected state T1 (a state where the plug 120 is plugged into the charging inlet 113), the switches SW1, SW2, SWv, the contactors K1, K2, and the contactors K5, K6 are in the open state. The voltage of the detection point P1 is 2.95 V, the voltage of the detection point P2 is 2.25 V, and the voltage of the detection point P3 is 0 V. In other words, when the plug 120 is inserted into the charging inlet 113, the voltage of the detection point P1 is changed from 12 V to 2.95 V and the voltage of the detection point P2 is changed from 0 V to 2.25 V.

Then, by detecting the change in the voltage of the detection point P1, the charger controller 173 can detect the fact that the plug 120 is fitted in the charging inlet 113. By detecting the change in the voltage of the detection point P2, the control unit 13 can detect the fact that the plug 120 is fitted in the charging inlet 113.

In a wakeup T2 after the connected state T1, the switch SW1 is set to the closed state. Then, when the voltage of the detection point P1 becomes 8.98 V, the charger controller 173 starts transmission of a charging handshake message. Various messages are transmitted through the S (+) signal line 163 and the S (+) signal line 133, and the S (−) signal line 164 and the S (−) signal line 134.

The control unit 13 detects the fact that the voltage of the detection point P2 is 8.28 V and confirms that the CC2 communication line 136 is connected to the CC2 communication line 166. Then, the control unit 13 starts transmission and reception of messages to and from the charger controller 173.

In a wakeup T3 after the wakeup T2, the control unit 13 sets the switch SWv to the closed state. Thereafter, the control unit 13 detects the voltage of the detection point P3 and determines a version of the connected charging device 103 based on the voltage of the detection point P3. For example, when the voltage of the detection point P3 is 6 V, the control unit 13 determines that the charging inlet 113 is connected to a predetermined charger.

After determining the version of the charging device 103 connected to the charging inlet 113, the control unit 13 sets the switch SWv to the open state.

In a wakeup T4 after the wakeup T3, the control unit 13 turns on an electronic lock to lock the charging inlet 113 to the plug 120. As such, the connection confirmation stage (S300) is completed.

Next, the adhesion check stage (S301) will be described. In the adhesion check stage, the control unit 13 detects whether the contactors K5, K6 are not adhered. Specifically, the contactor K5 and the contactor K6 are in the open state (OFF), and the charger controller 173 sets the contactor K1 and the contactor K2 to the open state (OFF) and the voltage measurement device 145 measures voltage. Then, when the voltage measured by the voltage measurement device 145 does not exceed, for example, 10 V, the control unit 13 determines that the contactor K5 and the contactor K6 are not adhered.

Next, the insulation test stage (S302) will be described. The charger controller 173 sets the contactors K1, K2 to the closed state (ON). The contactor K5 and the contactor K6 are in the open state (OFF). Then, the charger controller 173 outputs power from the charger 122 and executes an insulation test using the IMD 147. For example, the charger controller 173 confirms insulation between the DC(+) wiring 160 and the PE line 162, and insulation between the DC(−) wiring 161 and the PE line 162.

Then, upon confirming that there is no problem in each insulation state, the charger controller 173 drives the bleeder circuit 146, and then sets the contactor K1 and the contactor K2 to the open state (OFF). As such, the insulation test stage ends. The insulation test is continuously executed in the below-described charging stage, as well.

Returning to FIG. 11, in the charging handshake stage (S303), a version message, discharging compatibility information, and an identification message are exchanged between the BMS 138 and the charger controller 173.

Next, the charging elements arrangement stage (S304) will be described. After the charging handshake stage is completed, the charger controller 173 and the BMS 138 transmit and receive various charging elements messages and both of them determine whether the charging is possible. For example, the BMS 138 transmits a charging elements message BCP of a driving power accumulation battery to the charger controller 173.

The charging elements message BCP includes information indicating a charging voltage upper limit value (the maximum permissible charging total voltage) V2, the maximum permissible charging current value, the maximum permissible temperature, and the like of the power accumulation device 110.

Upon receiving the charging elements message BCP, the charger controller 173 transmits a charger time synchronization information message CTS, a charger maximum output capacity message CML, and a charger charging/discharging direction request message CCD to the BMS 138.

The charger time synchronization information message CTS includes time synchronization information transmitted by the charger controller 173 to the BMS 138. The charger maximum output capacity message CML includes information indicating the minimum output voltage value, the maximum output current value, and the minimum output current value.

The charger charging/discharging direction request message CCD includes information indicating a charging/discharging direction from the charging device 103. For example, "00" indicates the charging and "01" indicates the discharging.

Then, upon receiving the charger time synchronization information message CTS and the like, the BMS 138 determines whether the charging/discharging is possible. Upon determining that the charging/discharging is not possible, the BMS 138 transmits an error message and ends the charging elements arrangement stage (S304).

On the other hand, upon determining that the charging/discharging is possible, the BMS 138 transmits a charging preparation completion message BRO to the charger controller 173. The charging preparation completion message BRO indicates that the BMS 138 has completed stand-by for charging the charging device 103. When the BMS138 is set to a stand-by state, the contactors K5, K6 are set to the closed state (ON). Then, the BMS 138 ends the charging elements arrangement stage (S304).

Upon receiving the charging elements message BCP, the charger controller 173 determines whether the charging/discharging is possible. Then, upon determining that the charging/discharging is possible, the charger controller 173 transmits a charger output preparation completion message CRO to the BMS138. Then, the charger controller 173 turns on the contactors K1, K2.

On the other hand, upon determining that the charging/discharging is not possible, the charger controller 173 transmits an error message and ends the charging elements arrangement stage (S304).

Figure 12:
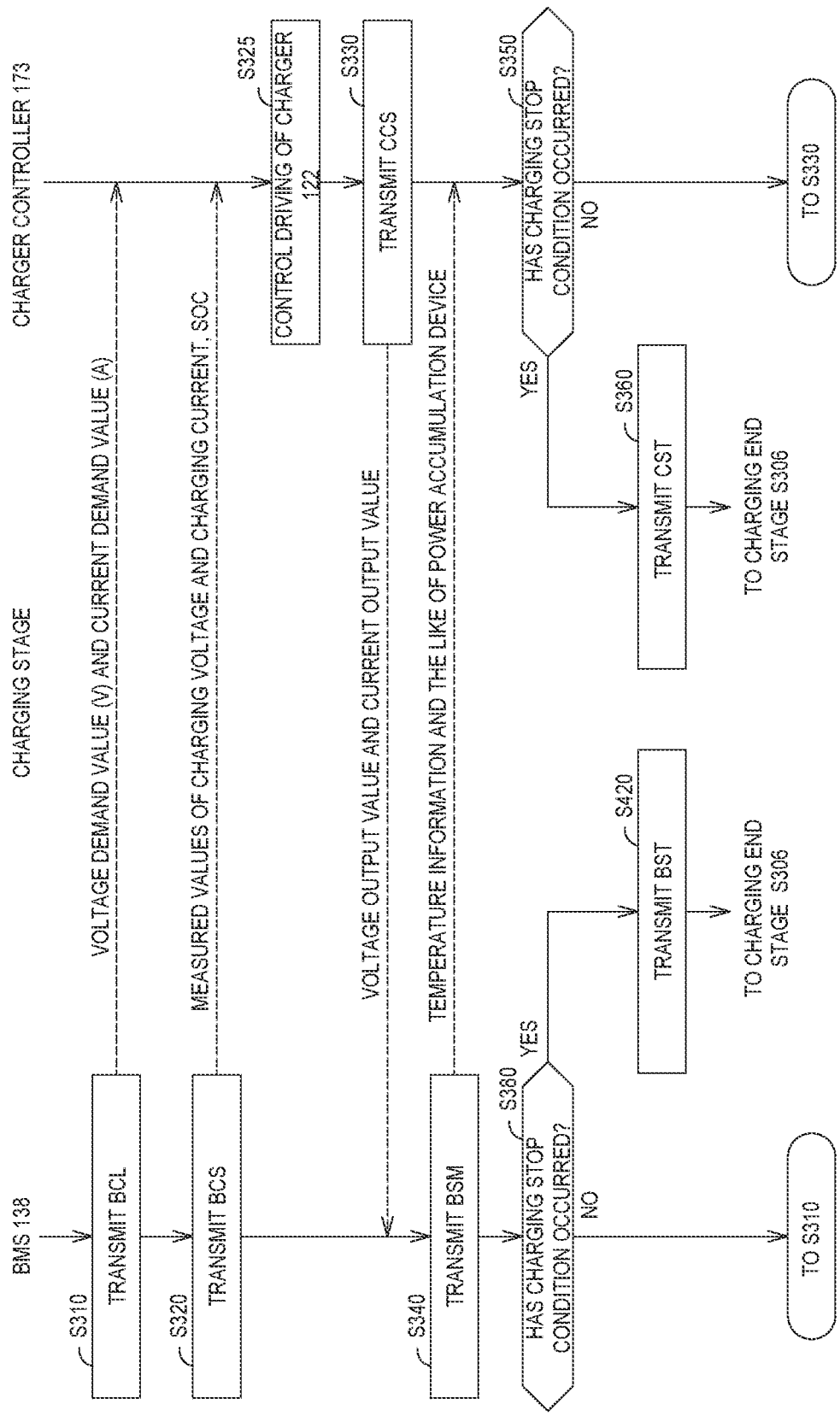
FIG. 12 is a flowchart illustrating a charging stage.

FIG. 12 is a flowchart illustrating the charging stage (S305). The BMS 138 transmits a battery charging demand message BCL to the charger controller 173 (S310). The battery charging demand message BCL includes a voltage demand value (V) and a current demand value (A).

Further, the BMS 138 transmits a battery charging total state message BCS to the charger controller 173 (S320). The battery charging total state message BCS includes information indicating a measured value of the charging voltage, a measured value of the charging current, a current SOC of the power accumulation device 110, and the like.

The charger controller 173 controls the driving of the charger 122 based on the information included in the battery charging demand message BCL and the battery charging total state message BCS (S325).

For example, the charger controller 173 adjusts the output power, the output voltage, the output current, and the like that are output from the charger 122 such that the measured value of the charging voltage becomes the voltage demand value and the measured value of the charging current becomes the current demand value.

Further, the charger controller 173 transmits a charger charging state message CCS to the BMS 138 (S330). The charger charging state message CCS includes information indicating a voltage output value, a current output value, and the like that are currently output by the charging device 103.

Then, the BMS 138 transmits a driving power accumulation battery state information message BSM to the charger controller 173 (S340).

The driving power accumulation battery state information message BSM includes information indicating the temperature of the power accumulation device 110, the SOC state of the power accumulation device 110, the charging current state of the power accumulation device 110, the temperature state of the power accumulation device 110, the insulation state of the power accumulation device 110, and the like.

The SOC state of the power accumulation device 110 is information indicating whether the SOC of the power accumulation device 110 is too high or normal. The charging current state of the power accumulation device 110 is information indicating whether the charging current is normal or overcurrent. The temperature state of the power accumulation device 110 is information indicating whether the temperature of the power accumulation device 110 is too high or normal.

The charger controller 173 determines whether the charging stop condition has occurred (S350). Here, the charging stop condition determined by the charger controller 173 includes a case where insulation failure is detected, a case where a charging pause message BST is received, and a case where the stop button 174 is pressed.

The insulation failure determined by the charger controller 173 means that abnormalities have occurred in the insulation between the DC(+) wiring 160 and the PE line 162, and the insulation between the DC(−) wiring 161 and the PE line 162. The charger controller 173 determines the insulation failure based on an input value from the IMD 147. The charging pause message BST is a message transmitted from the BMS 138 when the charging stop condition has occurred in the vehicle 102.

Upon determining that the insulation failure has occurred, the charger controller 173 determines that the charging stop condition has occurred (Yes in S350). Then, the charger controller 173 transmits a charging pause message CST to the BMS 138 (S360). Further, upon determining that the charging pause message BST has been received, the charger controller 173 also determines that the charging stop condition has occurred (Yes in S350). Then, the charger controller 173 transmits the charging pause message CST to the BMS 138 (S360). After transmitting the charging pause message CST, the charger controller 173 moves to the charging end stage (S306).

On the other hand, upon determining that the charging stop condition has not occurred (No in S350), the charger controller 173 continues the charging stage.

Figure 13:
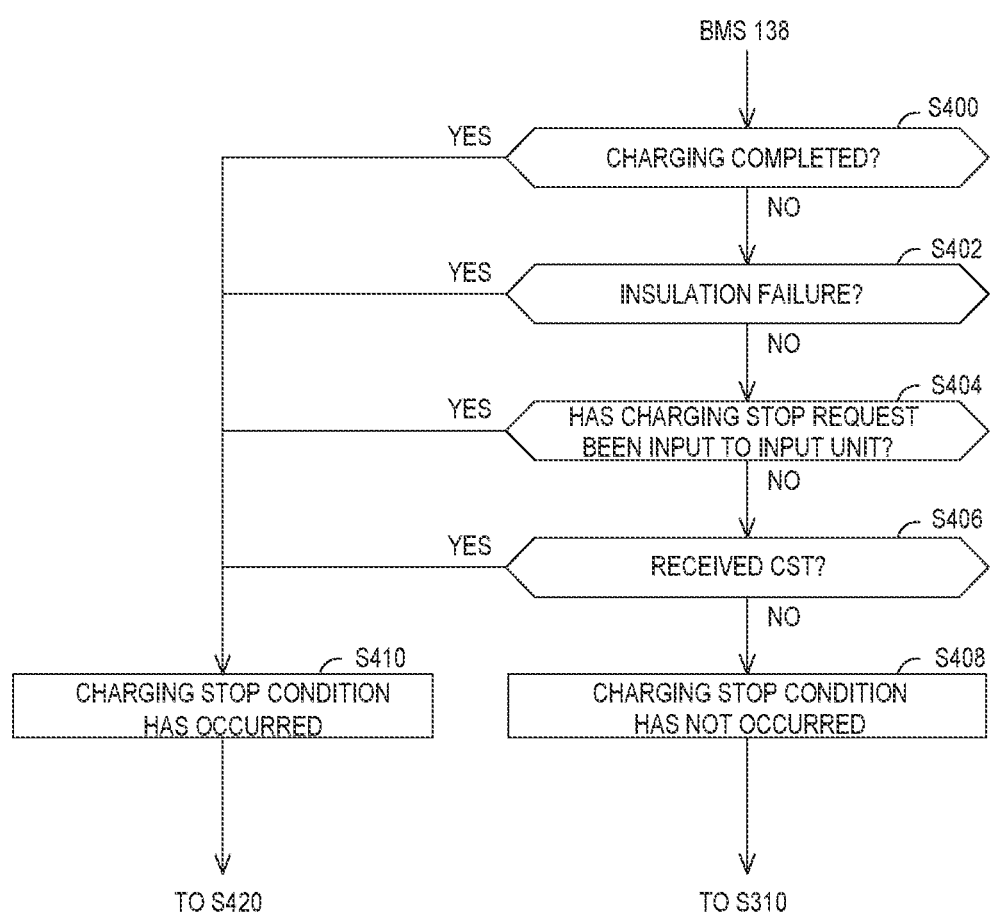
FIG. 13 is a control flow for determining whether a charging stop condition has occurred.

The BMS 138 determines whether the charging stop condition has occurred (S380). FIG. 13 is a control flow used for determining whether the charging stop condition has occurred. The charging stop condition determined by BMS 138 includes "charging completion", "insulation failure", "user stop", and "reception of the charging pause message CST".

The charging completion means a case where the SOC of the power accumulation device 110 becomes a target value. The insulation failure means a case, such as insulation failure in the power accumulation device 110. The user stop means a case where the charging stop request by the user is input to the input unit, in the same manner as in the first embodiment.

The reception of the charging pause message CST means whether the charging pause message CST transmitted from the charger controller 173 is received.

The BMS 138 determines whether the charging has been completed (S400). Upon determining that the charging has not been completed (No in S400), the BMS 138 determines whether the insulation has failed (S402).

Upon determining that the insulation has not failed (No in S402), the BMS 138 determines whether the charging stop request by the user has been input to the input unit (S404). In the same manner as in the first embodiment, in the second embodiment as well, the charging stop request by the user to the input unit means that the user requests the vehicle 102 to stop the charging by executing a predetermined operation on the input unit.

Upon determining that the charging stop request by the user has not been input to the input unit (No in S404), the BMS 138 determines whether the charging pause message CST has been received (S406).

Then, upon determining that it does not meet any of the "charging completion", the "insulation failure", the "user stop", and the "reception of charging pause message CST" included in the charging stop condition (No in S406), the BMS138 determines that the charging stop condition has not occurred (S408). Then, the BMS 138 returns to S310 illustrated in FIG. 12.

On the other hand, upon determining that the charging has been completed (Yes in S400), determining that the insulation has failed (Yes in S402), determining that the user has requested the charging stop to the input unit (Yes in S404), or determining that the charging pause message CST has been received (Yes in S406), the BMS138 determines that the charging stop condition has occurred (S410). Then, in FIG. 12, the BMS 138 transmits the charging pause message BST to the charger controller 173 (S420).

In FIG. 12, the charging pause message BST includes information indicating a cause of the pause. The information indicating the cause of the pause includes information for distinguishing between a normal pause, an error pause, and an emergency pause.

The normal pause corresponds to the case where the SOC of the power accumulation device 110 becomes the target SOC. The error pause corresponds to the case where the insulation failure occurs and the case where the charging pause message CST is received. The emergency pause corresponds to the case where the charging stop request by the user is input to the input unit. Then, after transmitting the charging pause message BST, the BMS 138 moves to the charging end stage (S306). When the BMS 138 and the charger controller 173 move to the charging end stage (S306), the charging ends.

In the same manner as in the first embodiment, in the second embodiment as well, the charging stop request by the user to the input unit means that the user requests the vehicle 102 to stop the charging by executing a predetermined operation on the input unit. As the "predetermined operation on the input unit", at least one of various operations exemplified below can be employed.

For example, in FIG. 10, examples of the "predetermined operation on the input unit" can include an "operation of continuously pressing the releasing button 29A a plurality of number of times". Alternatively, the examples of the "predetermined operation on the input unit" can include an "operation of continuously pressing the lock button 29B a plurality of number of times". The number of times may be, for example, three times.

Alternatively, in FIG. 10, the examples of the "predetermined operation on the input unit" can include an "operation of continuously pressing the door lock button 24A a plurality of number of times". Alternatively, the examples of the "predetermined operation on the input unit" can include an "operation of continuously pressing the door unlock button 24B a plurality of number of times".

Alternatively, the examples of the "predetermined operation on the input unit" can include "an operation of pushing at least one of the accelerator pedal 20, the IG switch 21, the brake pedal 22, the hazard switch 23, the door lock button 24A, and the door unlock button 24B" in predetermined procedures.

In the second embodiment as well, the user can stop the charging. Further, even in a charging device 103 in which a stop button 174 is not provided, the user can stop the charging using the input unit provided in the vehicle 102.

Third Embodiment

Figure 14:
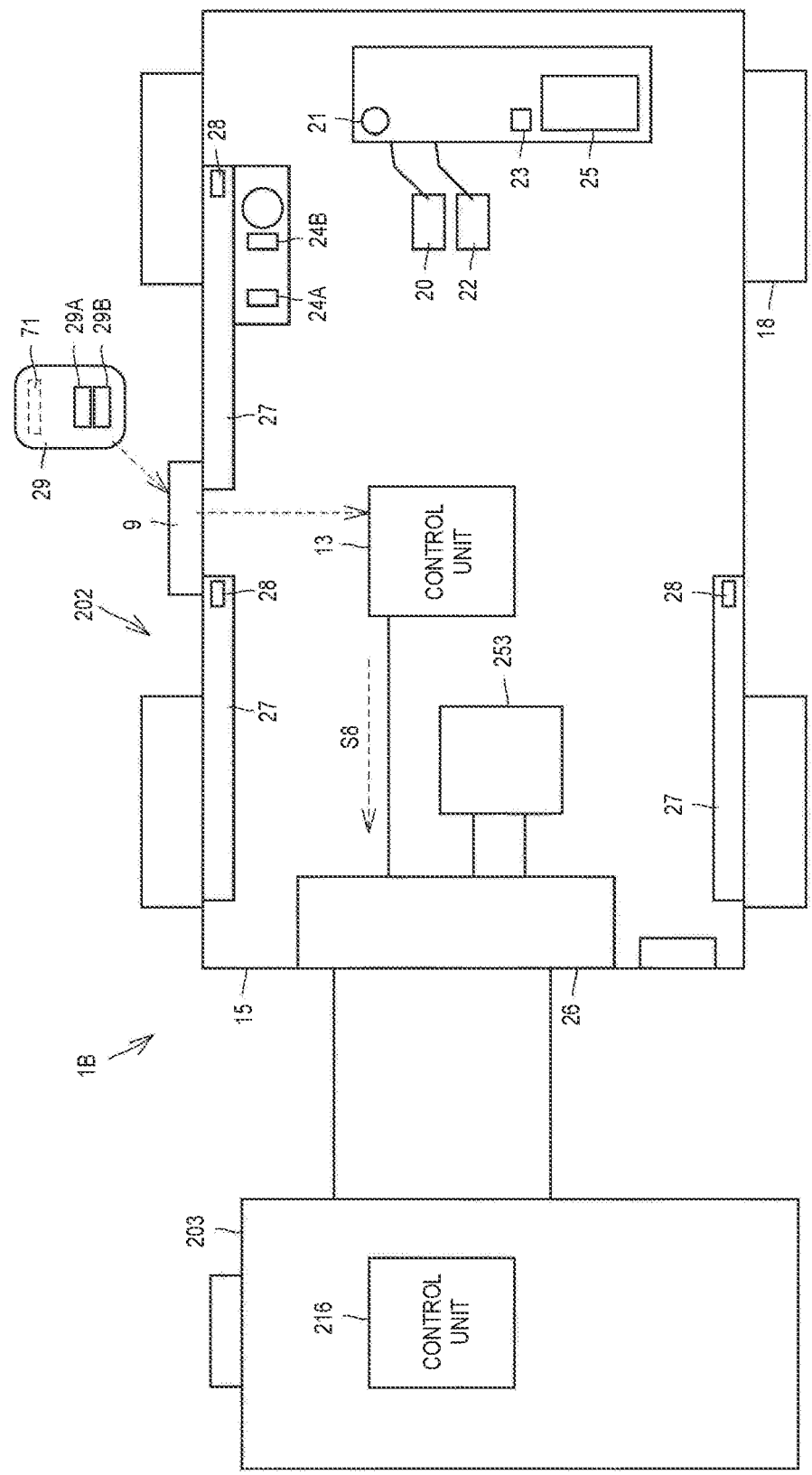
FIG. 14 is a block diagram schematically illustrating a charging system according to a third embodiment.

FIG. 14 is a block diagram schematically illustrating a charging system 1B according to a third embodiment. The charging system 1B includes a vehicle 202 and charging equipment 203. In the same manner as in the first and the second embodiments, the vehicle 202 also includes a plurality of input units. Examples of the input units include an accelerator pedal 20, an IG switch 21, a brake pedal 22, a hazard switch 23, a door lock button 24A, a door unlock button 24B, a display unit 25, and a key 29.

In the same manner as in the first and the second embodiments, in the third embodiment as well, the charging stop request by the user to the input unit means that the user requests the vehicle 202 to stop the charging by executing a predetermined operation on the input unit. As the "predetermined operation on the input unit", at least one of various operations exemplified below can be employed.

For example, the examples of the "predetermined operation on the input unit" can include an "operation of continuously pressing the releasing button 29A a plurality of number of times". Alternatively, the examples of the "predetermined operation on the input unit" can include an "operation of continuously pressing the lock button 29B a plurality of number of times". The number of times may be, for example, three times.

Alternatively, the examples of the "predetermined operation on the input unit" can include an "operation of continuously pressing the door lock button 24A a plurality of number of times". Alternatively, the examples of the "predetermined operation on the input unit" can include an "operation of continuously pressing the door unlock button 24B a plurality of number of times".

Alternatively, the examples of the "predetermined operation on the input unit" can include "an operation of pushing at least one of the accelerator pedal 20, the IG switch 21, the brake pedal 22, the hazard switch 23, the door lock button 24A, and the door unlock button 24B" in predetermined procedures.

When such an operation is executed, a charging stop signal S8 is transmitted from a control unit 255 to a control unit 216 even during the charging, and the charging by the charging equipment 203 is stopped.

Figure 15:
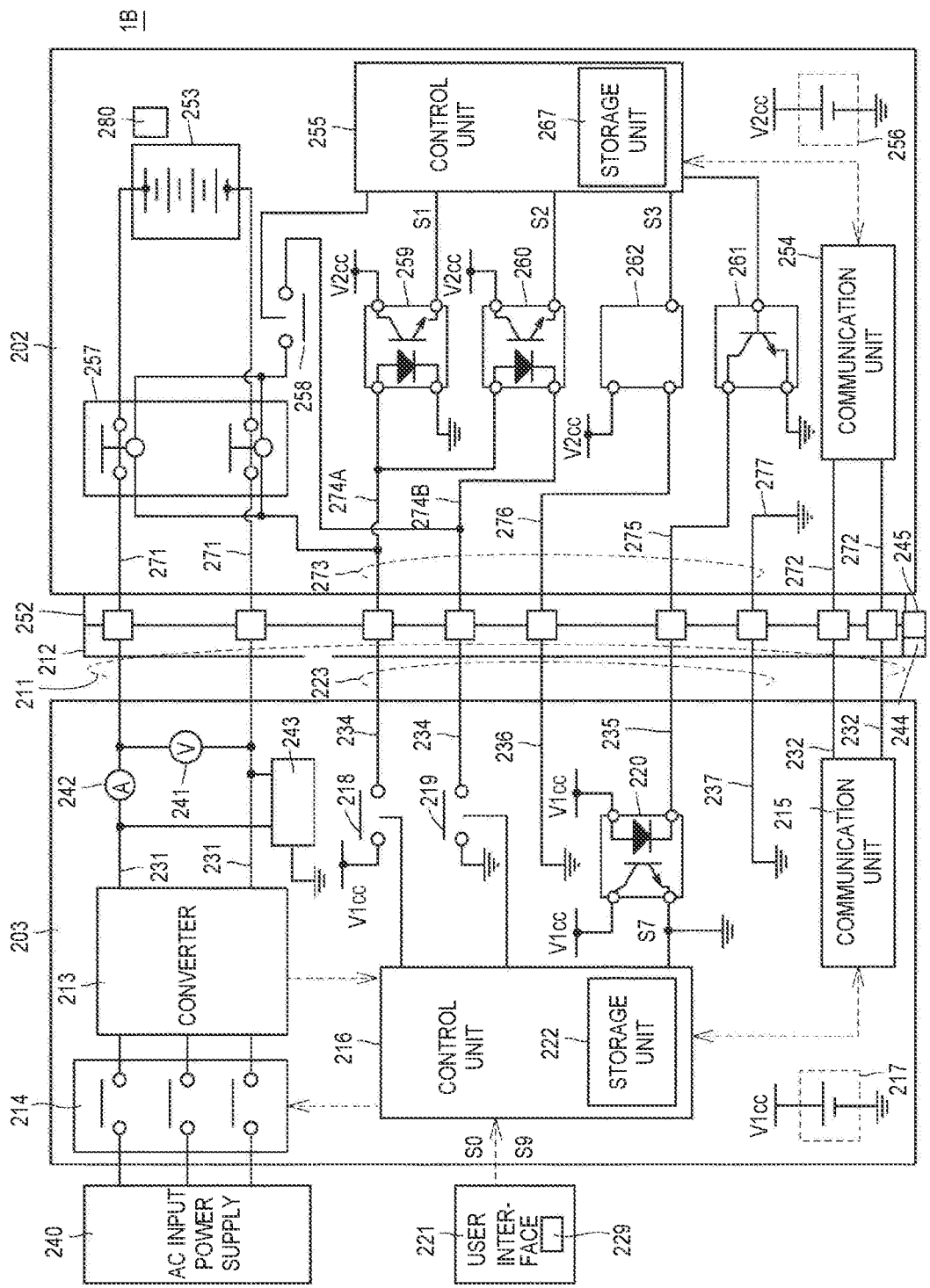
FIG. 15 is a schematic diagram illustrating a configuration relevant to a charging relationship on charging equipment and a vehicle.

FIG. 15 is a schematic diagram illustrating a configuration relevant to a charging relationship on the charging equipment 203 and the vehicle 202. The charging equipment 203 includes a charging cable 211, an equipment-side connector 212, a converter 213, an earth leakage circuit breaker (ELB) 214, a communication unit 215, the control unit 216, a control power supply 217, relays 218, 219, a photocoupler 220, and a user interface 221.

The charging cable 211 has a pair of charging lines 231, a pair of communication lines 232, and a control line 223.

The charging lines 231, 231 are power lines that deliver the charged power to the vehicle 202. The communication lines 232, 232 are communication lines used for communicating with the vehicle 202. The control line 223 includes a pair of charging start/stop lines 234, 234, a connector connection confirmation line 235, a charging prohibition permission line 236, and a ground line 237.

An equipment-side connector 212 is provided at the tip of the charging cable 211. The equipment-side connector 212 includes terminals connected to the charging lines 231, terminals connected to the communication lines 232, a terminal connected to the control line 223, and terminals connected to the charging start/stop lines 234, a terminal connected to the connector connection confirmation line 235, a terminal connected to the charging prohibition permission line 236, and a terminal connected to the ground line 237.

A latch 245 and a latch hold circuit 244 are provided on the equipment-side connector 212. The latch 245 allows the equipment-side connector 212 to be connected to the vehicle-side connector 252 and engaged therewith such that the equipment-side connector 212 does not protrude from the vehicle-side connector 252. The latch hold circuit 244 holds an engaged state by the latch 245 such that the equipment-side connector 212 does not protrude from the vehicle-side connector 252 during the charging.

The converter 213 is connected to an AC input power supply 240. The AC input power supply 240 includes an AC/DC rectifier, a DC/AC inverter, and an insulation transformer.

A voltmeter 241 is provided between a terminal of the equipment-side connector 212 and the AC input power supply 240, and measures voltage between the charging lines 231. The voltmeter 241 transmits a measured voltage value to the control unit 216. An ammeter 242 is provided on one of the charging lines 231. The ammeter 242 transmits a measured current value to the control unit 216. A ground fault detector 243 is connected to each charging line 231 and a ground line 237. The ground fault detector 243 transmits a detection result to the control unit 216.

The converter 213 converts alternating current power delivered from the AC input power supply 240 into direct current power. The ELB 214 is arranged between the converter 213 and the AC input power supply 240, and electrically connects or disconnects the converter 213 to or from the AC input power supply 240.

The communication unit 215 communicates with the vehicle 202 based on a communication protocol, such as a controller area network (CAN).

The control unit 216 controls the converter 213, the ELB 214, the communication unit 215, the relays 218, 219, the photocoupler 220, and the like.

The control unit 216 includes a storage unit 222. An outputtable voltage value V0 and the like are stored in the storage unit 222.

The control power supply 217 delivers driving power to the communication unit 215, the control unit 216, the relays 218, 219, the photocoupler 220, and the like.

The relay 218 is connected between the positive electrode side of the control power supply 217 and the charging start/stop line 234, and connects and disconnects the positive electrode of the control power supply 217 to and from the charging start/stop line 234 based on a control signal from the control unit 216.

The relay 219 is connected between the negative electrode (ground voltage) of the control power supply 217 and the charging start/stop line 234, and connects and disconnects the negative electrode of the control power supply 217 to and from the charging start/stop line 234 based on a control signal from the control unit 216.

The photocoupler 220 transfers, to the control unit 216, an advance preparation confirmation signal S7 according to whether the connector connection confirmation line 235 is conductive. In the photocoupler 220, when on-current flows through a light emitting element on the input side thereof, a light receiving element on the output side thereof outputs the advance preparation confirmation signal S7 to the control unit 216.

The user interface 221 is operated by the user, and may be, for example, a touch panel. The user can start the charging by pressing a charging start button displayed on the user interface 221. When the charging start button is pressed on the user interface 221, a charging start trigger S0 is transmitted to the control unit 216. A charging stop button 229 used for stopping the charging is provided on the user interface 221. When the charging stop button 229 is pressed, the charging by the charging equipment 203 is stopped, and a charging stop signal S9 is transmitted to the vehicle 202.

Next, the vehicle 202 will be described. The vehicle 202 includes the vehicle-side connector 252, a power accumulation device 253, a communication unit 254, the control unit 255, a control system power supply 256, relays 257, 258, photocouplers 259, 260, a switch 261, the detection circuit 262, and a sensor 280.

The vehicle 202 includes a pair of charging lines 271, a pair of communication lines 272, and a control line 273. The control line 273 includes a pair of charging start/stop lines 274A, 274B, a connector connection line 275, a charging permission prohibition line 276, and a ground line 277. Terminals corresponding to the respective lines are provided on the vehicle-side connector 252.

When the equipment-side connector 212 is connected to the vehicle-side connector 252, terminals provided on the equipment-side connector 212 are connected to those provided on the vehicle-side connector 252, respectively. As such, the charging line 231 and the charging line 271, the communication line 232 and the communication line 272, the charging start/stop line 234 and the charging start/stop line 274, the connector connection confirmation line 235 and the connector connection line 275, the charging prohibition permission line 236 and a charging permission prohibition line 276, and the ground line 237 and the ground line 277 are electrically connected, respectively.

The power accumulation device 253 is a secondary battery that delivers power to a driving device including a driving motor and an inverter that cause the vehicle 202 to travel. A sensor 280 is provided on the power accumulation device 253, and measures the temperature of the power accumulation device 253 and transmits temperature information of the power accumulation device 253 to the power accumulation device 253. The communication unit 254 communicates with the charging equipment 203 based on a communication protocol, such as the CAN.

The control unit 255 controls driving of the communication unit 254, the control system power supply 256, the relays 257, 258, the photocoupler 259, and the like. The control system power supply 256 delivers power to respective equipment, such as the communication unit 254, the control unit 255, and the control system power supply 256.

The control unit 255 includes a storage unit 267, and the storage unit 267 stores information including the battery maximum voltage value V1 and a battery yield strength upper limit value V4 of the power accumulation device 253. The battery maximum voltage value V1 may be, for example, the voltage of the power accumulation device 253 at the time of full charging. The battery maximum voltage value V1 may be, for example, the voltage value of the power accumulation device 253 when the SOC is 80%.

The battery yield strength upper limit value V4 is voltage at which the vehicle 202 stops the charging to protect the power accumulation device 253.

The relay 257 connects and disconnects the charging line 271 to and from the power accumulation device 253. The relay 257 is open in a normal state. When the relay 258, the relay 218, and the relay 219 are set to the closed state, driving power is delivered from the control power supply 217 of the charging equipment 203 to the relay 257.

When driving power is delivered to the relay 257, the relay 257 is set to the closed state and the power accumulation device 253 is connected to the charging line 271.

One end of the relay 258 is connected to one charging start/stop line 274A that is connected to the relay 218, and the other end of the relay 258 is connected to the other charging start/stop line 274B that is connected to the relay 219. Then, when the relays 218, 219 and the relay 258 are set to the closed state, driving power is delivered to the relay 257, and the relay 257 is set to the closed state.

While the connectors are in a state of being connected to each other, when the relay 218 is set to the closed state, the photocoupler 259 transmits an advance preparation signaling signal S1 to the control unit 255. Specifically, the photocoupler 259 includes a light emitting element connected to the charging start/stop line 274A and a ground potential, and a light receiving element connected between the control unit 255 and the control system power supply 256.

While the connectors are in the connected state, when the relay 218 is set to the closed state, the light emitting element emits light and the light receiving element receives light. Then, the light receiving element transmits the advance preparation signaling signal S1 to the control unit 255.

While each connector is in the connected state, the photocoupler 260 transmits a charging start signaling signal S2 to the control unit 255 according to an open/closed state of the relays 218, 219. Specifically, the photocoupler 260 includes a light emitting element connected to the charging start/stop line 274A and the charging start/stop line 274B, and a light receiving element connected to the control system power supply 256 and the ground potential.

Then, while each connector is in the connected state, when the relays 218, 219 are set to the closed state, the light emitting element emits light and the light receiving element receives light. Then, the light receiving element transmits the charging start signaling signal S2 to the control unit 255.

While each connector is in the connected state, when an on-current is delivered from the control unit 255, the switch 261 electrically conducts the connector connection line 275.

Specifically, the switch 261 is connected between the connector connection line 275 and the ground potential. When the on-current is delivered from the control unit 255 to the switch 261, the switch 261 connects the connector connection line 275 to the ground potential.

Figure 16:
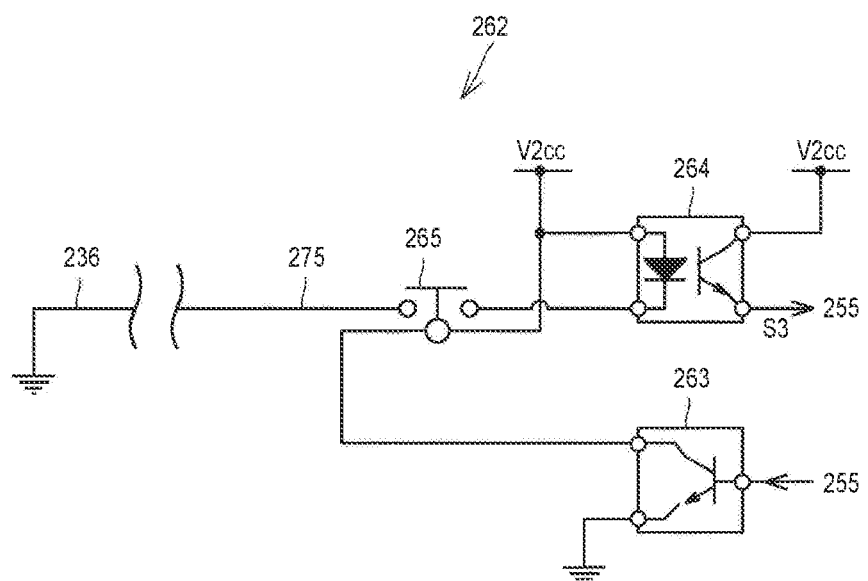
FIG. 16 is a block diagram illustrating a detection circuit.

FIG. 16 is a block diagram illustrating a detection circuit 262. While the equipment-side connector 212 is connected to the vehicle-side connector 252, the detection circuit 262 transmits a connector connection confirmation signal S3 to the control unit 255. The detection circuit 262 includes a switch 263, a photocoupler 264, and a switch 265. When an ignition switch of the vehicle 202 is turned on, the on-current is delivered from the control unit 255 to the switch 263, and the switch 263 is turned on. When the photocoupler 264 is turned on, the switch 265 is set to the closed state, and the switch 265 electrically connects the connector connection line 275 to the photocoupler 264. The photocoupler 264 includes a light emitting element and a light receiving element.

When the switch 265 is set to the closed state, driving power is delivered from the control power supply 217 to the light emitting element to emit light. The light receiving element receives light from the light emitting element and transmits the connector connection confirmation signal S3 to the control unit 255.

Figure 17:
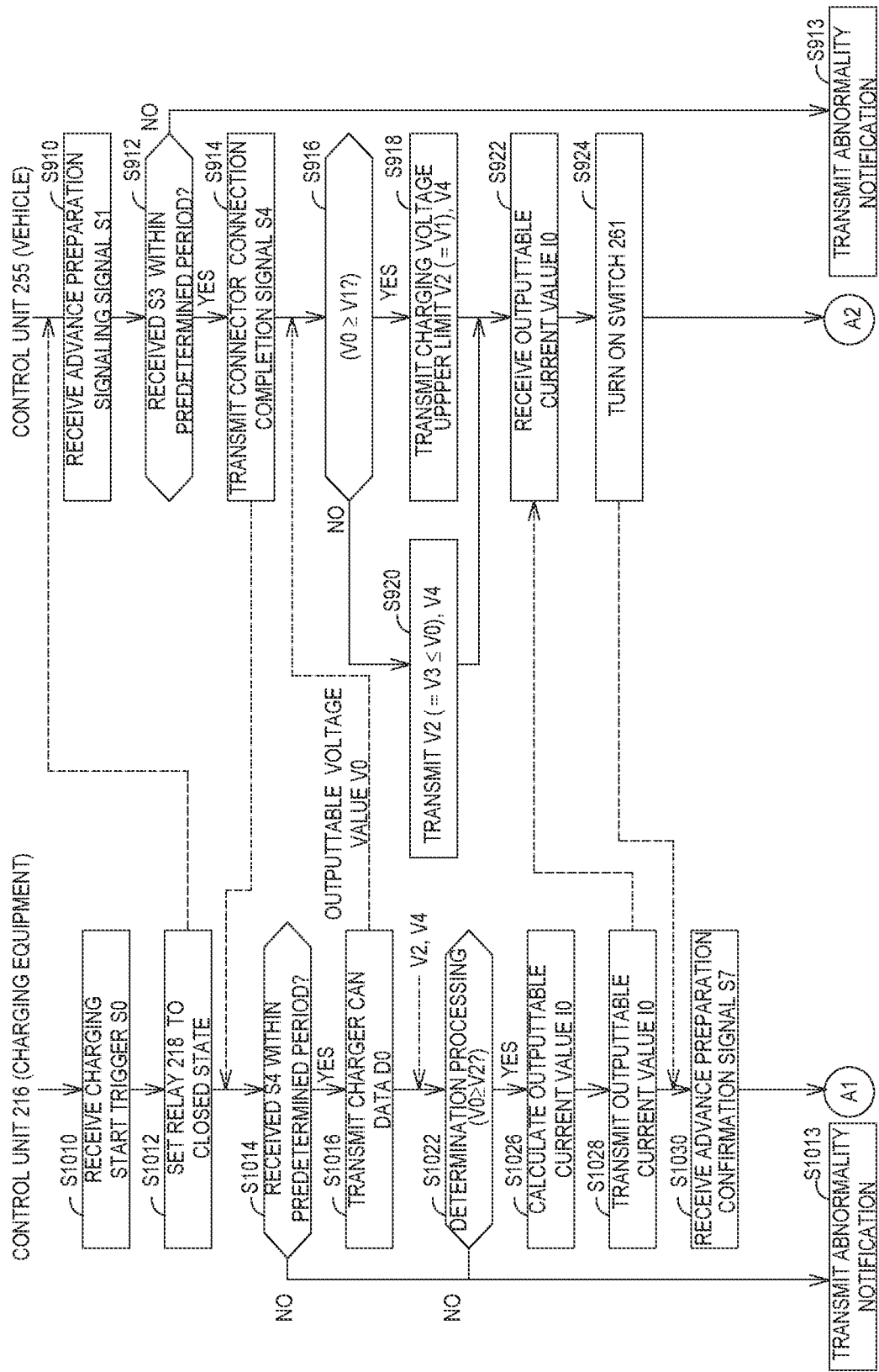
FIG. 17 is a flowchart illustrating a charging flow from a time at which connectors are connected to each other to a time at which charging is started.
Figure 18:
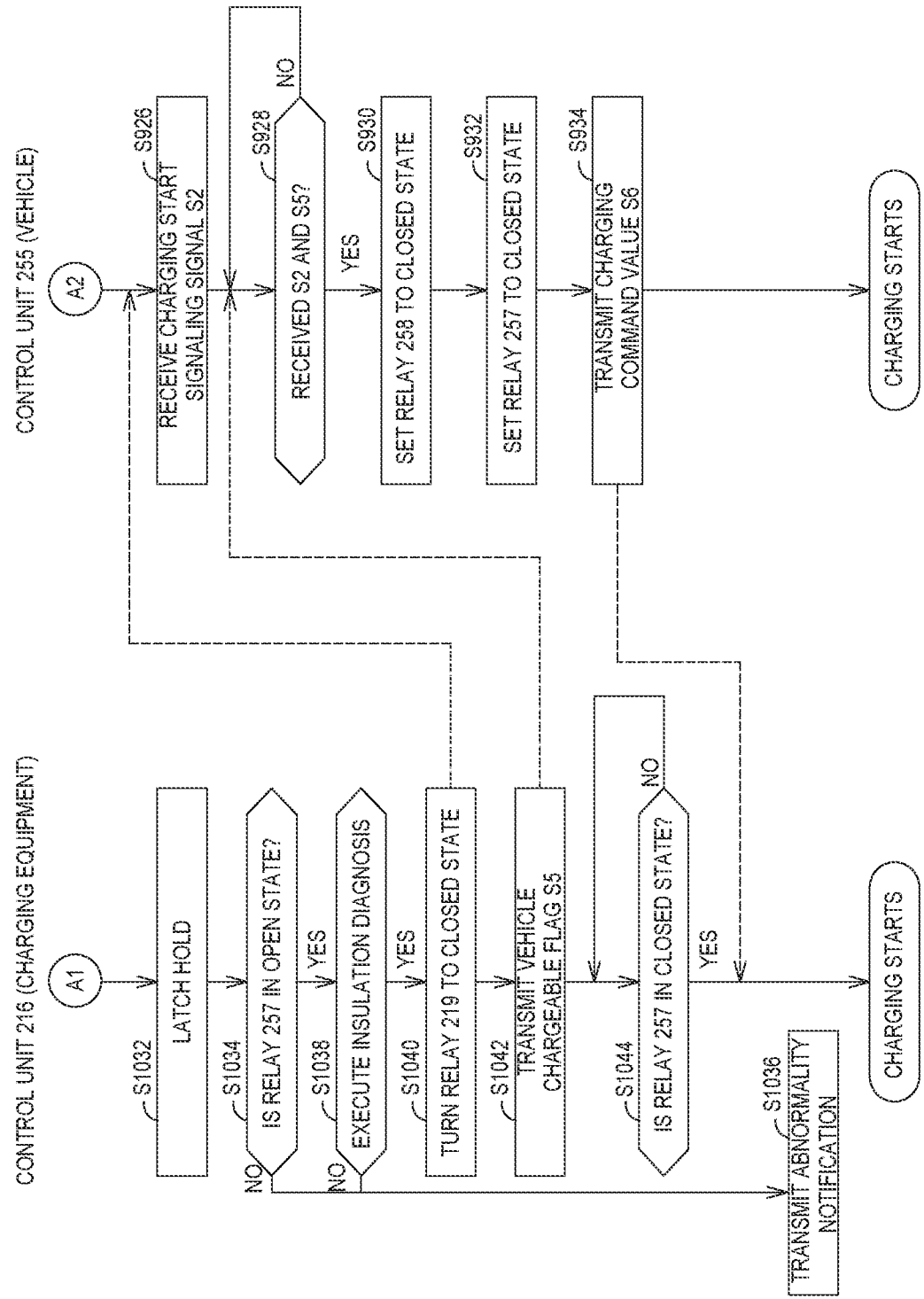
FIG. 18 is another flowchart illustrating the charging flow from the time at which connectors are connected to each other to the time at which the charging is started.

FIGS. 17 and 18 are flowcharts illustrating a charging flow from a time at which the connectors are connected to each other to a time at which the charging is started.

While the equipment-side connector 212 is connected to the vehicle-side connector 252, when the control unit 216 receives the charging start trigger S0 (S1010), the control unit 216 sets the relay 218 to the closed state (S1012). When the relay 218 is set to the closed state, the advance preparation signaling signal S1 is transmitted from the photocoupler 259 to the control unit 255. The charging start trigger S0 is transmitted from the user interface 221 to the control unit 216 by an operation of the user.

Upon receiving the advance preparation signaling signal S1 (S910), the control unit 255 determines whether the connector connection confirmation signal S3 has been received (S912).

Upon determining that the connector connection confirmation signal S3 has not been received (No in S912), the control unit 255 transmits an abnormal notification to the charging equipment 203 (S913).

On the other hand, upon determining that the connector connection confirmation signal S3 has been received (Yes in S912), the control unit 255 transmits a connector connection completion signal S4 to the control unit 216 through the communication line 272 and the communication line 232 (S914).

The control unit 216 determines whether the connector connection completion signal S4 has been received within a predetermined period (S1014). Upon determining that the connector connection completion signal S4 has been received within the predetermined period (Yes in S1014), the control unit 216 transmits a charger CAN data D0 to the control unit 255 through the communication line 232 and the communication line 272 (S1016). The charger CAN data D0 includes the outputtable voltage value V0 of the charging equipment 203.

The control unit 255 determines whether the outputtable voltage value V0 is equal to or higher than the battery maximum voltage value V1 (S916). Upon determining that the outputtable voltage value V0 is equal to or higher than the battery maximum voltage value V1 (Yes in S916), the control unit 255 transmits a charging voltage upper limit value V2 and the battery yield strength upper limit value V4 to the control unit 216 (S918). At this time, the charging voltage upper limit value V2 is the battery maximum voltage value V1. The charging voltage upper limit value V2 is a value transmitted from the control unit 255 to the control unit 216 as the maximum voltage value of the power accumulation device 253.

Upon determining that the battery maximum voltage value V1 is higher than the outputtable voltage value V0 (No in S916), the control unit 255 transmits the charging voltage upper limit value V2 and the battery yield strength upper limit value V4 to the control unit 216 (S920). At this time, the charging voltage upper limit value V2 is set to the maximum voltage value V3. The maximum voltage value V3 is a value equal to or lower than the outputtable voltage value V0. The maximum voltage value V3 may be set as the outputtable voltage value V0.

Upon receiving the charging voltage upper limit value V2 and the battery yield strength upper limit value V4, the control unit 216 executes determination processing (S1022). Specifically, the control unit 216 determines whether the outputtable voltage value V0 is equal to or higher than the charging voltage upper limit value V2 (S1022). When the outputtable voltage value V0 is equal to or higher than the charging voltage upper limit value V2, the control unit 216 determines that the power accumulation device 253 can be fully charged.

On the other hand, when the charging voltage upper limit value V2 is higher than the outputtable voltage value V0, the control unit 216 determines that the power accumulation device 253 cannot be fully charged.

For this reason, when the charging voltage upper limit value V2 is higher than the outputtable voltage value V0, the control unit 216 transmits the abnormality notification to the control unit 255 (S1013). The abnormality notification may include a battery incompatibility notification indicating that the power accumulation device 253 cannot be fully charged. Then, the control unit 216 does not start the charging.

Upon determining that the outputtable voltage value V0 is equal to or higher than the charging voltage upper limit value V2 (Yes in S1022), the control unit 216 calculates an outputtable current value I0 (S1026).

The outputtable current value I0 is calculated based on a lower voltage value of the battery yield strength upper limit value V4 and the outputtable voltage value V0. The control unit 216 transmits the outputtable current value I0 to the control unit 255 (S1028).

Upon receiving the outputtable current value I0 (S922), the control unit 255 turns on the switch 261 (S924). When the switch 261 is turned on, the light emitting element of the photocoupler 220 emits light, and the light receiving element of the photocoupler 220 receives light. The light receiving element of the photocoupler 220 transmits the advance preparation confirmation signal S7 to the control unit 216. As such, the control unit 216 receives the advance preparation confirmation signal S7 (S1030).

In FIG. 18, upon receiving the advance preparation confirmation signal S7, the control unit 216 executes a latch hold (S1032). Specifically, the control unit 216 drives the latch hold circuit 244 to hold a locked state of the latch 245.

Then, the control unit 216 confirms whether the relay 257 is in the open state (S1034). Specifically, when the voltage value acquired from the voltmeter 241 is equal to or lower than a predetermined voltage, the control unit 216 determines that the relay 257 is in the open state, and when the voltage value acquired from the voltmeter 241 is higher than the predetermined voltage, the control unit 216 determines that the relay 257 is in the closed state.

Upon determining that the relay 257 is in the closed state (No in S1034), the control unit 216 transmits the abnormality notification to the control unit 255 (S1036).

On the other hand, upon determining that the relay 257 is in the open state (Yes in S1034), the control unit 216 executes an insulation diagnosis (S1038).

Specifically, the control unit 216 drives the converter 213 and outputs the predetermined voltage. Then, the control unit 216 executes the insulation diagnosis on the charging equipment 203 side based on the current value acquired from the ammeter 242 and the output value from the ground fault detector 243.

As a result of the insulation diagnosis, upon determining that there is an abnormality (No in S1038), the control unit 216 transmits the abnormality notification to the control unit 255 (S1036).

On the other hand, as a result of the insulation diagnosis, upon determining that there is no problem (Yes in S1038), the control unit 216 sets the relay 219 to the closed state (S1040). The relay 218 is already in the closed state, and when the relay 219 is set to the closed state, the light emitting element of the photocoupler 260 emits light, and the light receiving element of the photocoupler 260 receives light. Then, the light receiving element of the photocoupler 260 transmits the charging start signaling signal S2 to the control unit 255. As such, the control unit 255 receives the charging start signaling signal S2 (S926).

The control unit 216 transmits a vehicle chargeable flag S5 (S1042). The vehicle chargeable flag S5 is transmitted to the control unit 255 through the communication line 232 and the communication line 272.

The control unit 255 determines whether the charging start signaling signal S2 and the vehicle chargeable flag S5 have been received (S928). Upon receiving the vehicle chargeable flag S5 and the charging start signaling signal S2 (Yes in S928), the control unit 255 sets the relay 258 to the closed state (S930).

Here, when the relay 258 is set to the closed state, driving power is delivered from the control power supply 217 to the relay 257. As such, the relay 257 is set to the closed state (S932).

The control unit 216 confirms whether the relay 257 is in the closed state (S1044). Specifically, when the relay 257 is set to the closed state, the voltage of the power accumulation device 253 is applied to the voltmeter 241. Then, when the voltage value acquired from the voltmeter 241 is equal to or higher than a predetermined value, the control unit 216 determines that the relay 257 is in the closed state.

The control unit 255 transmits a charging command value S6 to the control unit 216 (S934). The control unit 255 sets the charging command value S6 to a value lower than the outputtable current value I0. Upon determining that the relay 257 is in the closed state (Yes in S1044), the control unit 216 starts the charging based on the charging command value S6 (S1050).

Figure 19:
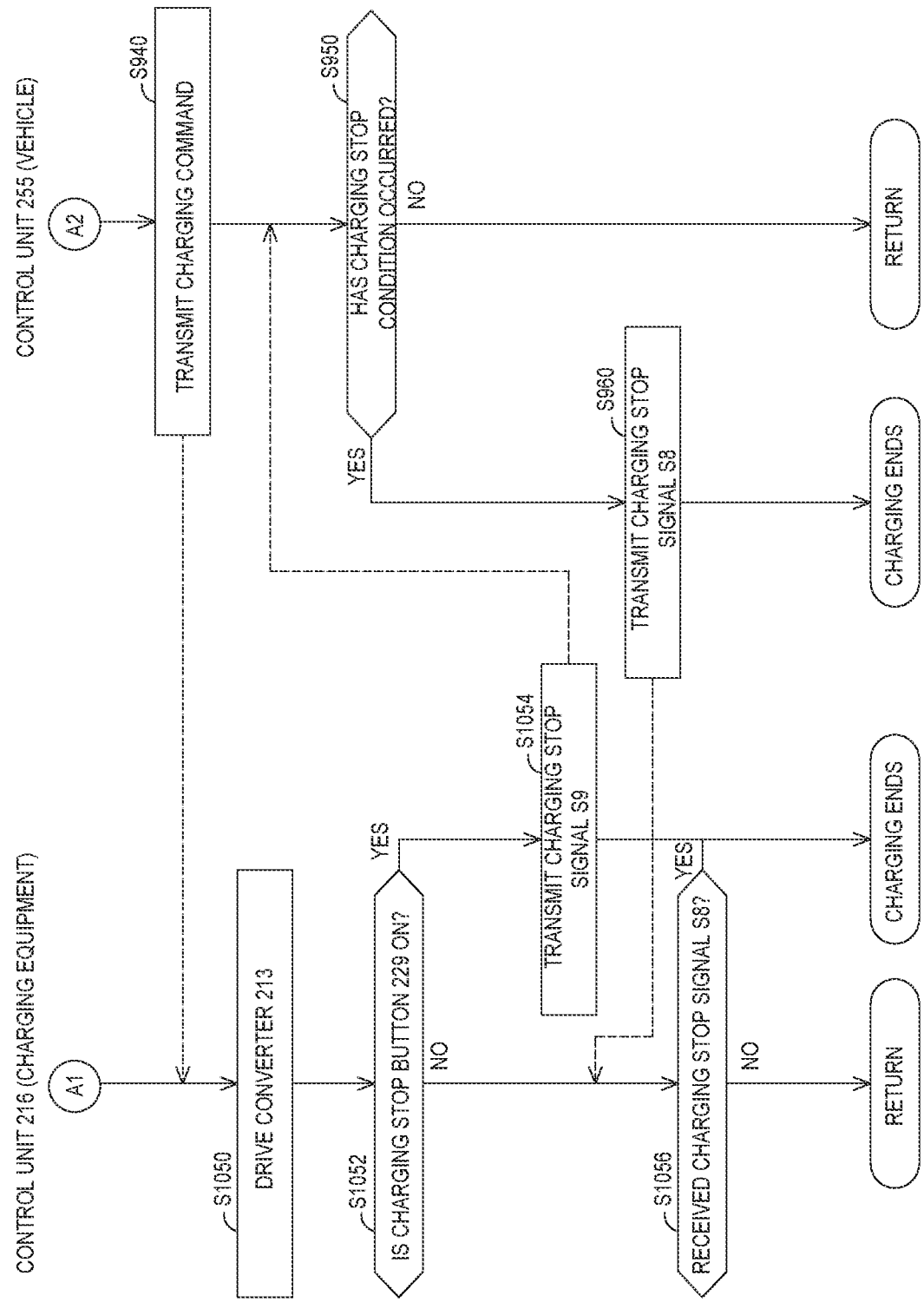
FIG. 19 is a flowchart illustrating a control flow in a charging stage.

FIG. 19 is a flowchart illustrating a control flow in the charging stage. The control unit 255 transmits a charging command to the control unit 216 (S940). The charging command includes a command value of a charging current.

Upon receiving the charging command, the control unit 216 drives the converter 213 and outputs the charging current from the converter 213 (S1050).

The control unit 216 determines whether the charging stop button 229 has been pressed (S1052). Upon determining that the charging stop button 229 has been pressed (Yes in S1052), the control unit 216 transmits the charging stop signal S9 to the control unit 255 (S1054). Thereafter, the control unit 216 ends the charging control.

On the other hand, upon determining that the charging stop button 229 has not been pressed (No in S1052), the control unit 216 determines whether the charging stop signal S8 has been received (S1056). Upon determining that the charging stop signal S8 has been received (Yes in S1056), the control unit 216 ends the charging.

On the other hand, upon determining that the charging stop signal S8 has not been received (No in S1056), the control unit 216 returns to S1050.

After receiving the charging command, the control unit 255 determines whether the charging stop condition has occurred (S950). Upon determining that the charging stop condition has occurred (Yes in S950), the control unit 255 transmits the charging stop signal S8 to the control unit 216 (S960). On the other hand, upon determining that the charging stop condition has not occurred (No in S950), the control unit 255 returns to S940.

FIG. 20 is a specific flow used for determining whether the charging stop condition of the control unit 255 has occurred.

The control unit 255 determines whether the charging of the power accumulation device 253 has been completed (S1100). Upon determining that the charging has not been completed (No in S1100), the control unit 255 determines whether the temperature of the power accumulation device 253 is higher than a predetermined temperature (S1110). Upon determining that the temperature of the power accumulation device 253 is lower than the predetermined temperature (No in S1110), the control unit 255 determines whether the voltage of the power accumulation device 253 is higher than the predetermined voltage (the battery yield strength upper limit value V4) (S1120).

Upon determining that the voltage of the power accumulation device 253 is lower than the battery yield strength upper limit value V4 (No in S1120), the control unit 255 determines whether the charging stop request has been input to the input unit (S1130).

In the same manner as in the first and the second embodiments, in the third embodiment as well, the charging stop request by the user to the input unit means that the user requests the vehicle 202 to stop the charging by executing a predetermined operation on the input unit. The examples of the "predetermined operation on the input unit" can include an "operation of continuously pressing the door unlock button 24B a plurality of number of times".

Alternatively, the examples of the "predetermined operation on the input unit" can include "an operation of pushing at least one of the accelerator pedal 20, the IG switch 21, the brake pedal 22, the hazard switch 23, the door lock button 24A, and the door unlock button 24B" in predetermined procedures.

Then, upon determining that the charging stop request by the user has not been input to the input unit (No in S1130), the control unit 255 determines whether the charging stop signal S9 has been received (S1140).

Then, upon determining that the charging stop signal S9 has not been received (No in S1140), the control unit 255 determines that the charging stop condition has not occurred (S1150) and then returns to S940 illustrated in FIG. 19.

On the other hand, upon determining that the charging has been completed (Yes in S1100), determining that the temperature of the power accumulation device 253 is higher than the predetermined temperature (Yes in S1110), determining that the voltage of the power accumulation device 253 is equal to or higher than the battery yield strength upper limit value V4 (Yes in S1120), determining that the charging stop request has been input to the input unit (Yes in S1130), or determining that the charging stop signal S9 has been received (Yes in S1140), the control unit 255 determines that the charging stop condition has occurred (S1160). Then, the control unit 255 transmits the charging stop signal S8 in S960 illustrated in FIG. 19.

The embodiments disclosed herein should be considered as illustrative in all points, and not be considered as limited. The scope of the present disclosure is defined by the claims, and is intended to include meanings equivalent to the claims and all modifications within the scope thereof.

What is claimed is:

1. A vehicle configured to receive power from a charging device provided outside, the vehicle comprising:
    an inlet unit to which a charging connector provided in the charging device is connected;
    a control unit configured to communicate with the charging device;
    a power accumulation device charged with power delivered through the charging connector; and
    an input unit to which a user makes an input, the input unit includes at least one of an accelerator pedal, a brake pedal, an ignition switch, a hazard switch, and a door lock button;
    wherein the control unit is configured to, upon determining that a charging stop request is input to the input unit during charging, stop the charging;
    wherein the control unit is configured to, upon determining that a charging stop operation, set in advance, is executed on the input unit, determine that the charging stop request is input to the input unit; and
    wherein the input to initiate the charging stop operation is performed in a predetermined continuous operation in a predetermined pattern on the input unit.

2. The vehicle according to claim 1, wherein the charging stop operation is an operation of a door unlock button a plurality of number of times.

3. A charging system comprising:
    a charging device including a charging connector; and
    a vehicle configured to receive power from the charging device provided outside, wherein:
    the vehicle includes:
    an inlet unit to which a charging connector provided in the charging device is connected;
    a control unit configured to communicate with the charging device;
    a power accumulation device charged with power delivered through the charging connector; and
    an input unit to which a user makes an input, the input unit includes at least one of an accelerator pedal, a brake pedal, an ignition switch, a hazard switch, and a door lock button;
    the control unit is configured to, upon determining that a charging stop request is input to the input unit during charging, transmit a request to stop the charging to the charging device; and
    the control unit is configured to, upon determining that a charging stop operation, set in advance, is executed on the input unit, determine that the charging stop request is input to the input unit;
    wherein the input to initiate the charging stop operation is performed in a predetermined continuous operation in a predetermined pattern on the input unit.

4. The charging system according to claim 3, wherein the charging stop operation is an operation of a door unlock button a plurality of number of times.

\* \* \* \* \*